United States Patent
Ikegami et al.

(10) Patent No.: US 7,547,539 B2
(45) Date of Patent: Jun. 16, 2009

(54) REACTION APPARATUS FOR ORGANIC AND/OR OTHER SUBSTANCES EMPLOYING SUPERCRITICAL FLUID OR SUBCRITICAL FLUID

(75) Inventors: Makoto Ikegami, 1-14-10, Asahigaoka, Otsu-shi, Shiga 520-0052 (JP); Ken Kawabe, Osaka (JP)

(73) Assignees: Yanmar Co., Ltd., Osaka (JP); Makoto Ikegami, Shiga (JP); Shiro Saka, Shiga (JP)

(*) Notice: Subject to any disclaimer, the term of this patent is extended or adjusted under 35 U.S.C. 154(b) by 476 days.

(21) Appl. No.: 10/469,869

(22) PCT Filed: Mar. 6, 2002

(86) PCT No.: PCT/JP02/02090

§ 371 (c)(1),
(2), (4) Date: Sep. 5, 2003

(87) PCT Pub. No.: WO02/070119

PCT Pub. Date: Sep. 12, 2002

(65) Prior Publication Data

US 2004/0094144 A1  May 20, 2004

(30) Foreign Application Priority Data

Mar. 7, 2001 (JP) ............................. 2001-062855

(51) Int. Cl.
*C12M 1/00* (2006.01)
*B09B 3/00* (2006.01)

(52) U.S. Cl. ............... 435/289.1; 435/290.1; 435/291.1; 435/294.1; 435/300.1; 422/184.1; 127/1; 60/620; 60/525

(58) Field of Classification Search ............ 435/291.1, 435/293.1, 300.1; 422/184.1, 295; 127/1; 162/21; 123/52.2, 52.3, 52.5; 60/620

See application file for complete search history.

(56) References Cited

U.S. PATENT DOCUMENTS 1,036,288 A * 8/1912 Maricardi .................. 123/46 A (Continued)

FOREIGN PATENT DOCUMENTS

JP          01-038532 B2    8/1989

(Continued)

OTHER PUBLICATIONS

Sasaki et al., Department of Chemical Engineering, Tohoku University, Sendai, Japan "Cellulose hydrolysis in subcritical and supercritical water" The Journal of Supercritical Fluids 13 (1998) p. 261-268, Elsevier Science.

(Continued)

*Primary Examiner*—William H Beisner
(74) *Attorney, Agent, or Firm*—Cheng Law Group PLLC

(57) ABSTRACT

Disclosed is a reaction apparatus for organic and/or other substance(s) employing supercritical fluid(s) and/or subcritical fluid(s) permitting injection of organic substance(s) and/or other reactant substance(s) in homogeneous state(s) to reactor(s) without occurrence of clogging at location(s) of such injection, and also permitting actuation to occur in industrial fashion and at high energy efficiency. Reactor(s) (12) of this reaction apparatus comprise cylinder(s) (12a) and piston(s) (12b) provided at such cylinder(s) (12a). Actuation in periodic fashion is permitted by operating piston(s) (12b) to compress fluid vapor(s) and obtain supercritical fluid(s) and/or subcritical fluid(s); operating piston(s) (12b) in reverse direction(s) following conclusion of chemical reaction(s) of reactant substance(s), lowering temperature(s) and pressure(s) and stopping reaction(s); and removing, from cylinder(s) (12a), product(s) obtained while at the same time delivering new charge(s) of fluid vapor(s) to cylinder(s) (12a).

22 Claims, 19 Drawing Sheets

U.S. PATENT DOCUMENTS

| | | | | |
|---|---|---|---|---|
| 1,744,343 | A | * | 1/1930 | Spotz ........................ 60/39.59 |
| 2,166,975 | A | * | 7/1939 | Sologaistoa .................... 74/52 |
| 2,814,551 | A | * | 11/1957 | Broeze et al. ................. 60/525 |
| 5,921,478 | A | | 7/1999 | Kamiwano et al. |
| 6,120,732 | A | | 9/2000 | Toledo et al. |
| 6,187,939 | B1 | | 2/2001 | Sasaki et al. |

FOREIGN PATENT DOCUMENTS

| | | |
|---|---|---|
| JP | 10-192670 A1 | 7/1998 |
| JP | 11-188398 A1 | 7/1999 |
| JP | 2000-104690 A1 | 4/2000 |
| JP | 2000-143586 A1 | 5/2000 |
| JP | 2000-233127 A1 | 8/2000 |
| JP | 2000-279976 A1 | 10/2000 |
| JP | 2000-282064 A1 | 10/2000 |
| JP | 2000-309663 A1 | 11/2000 |
| JP | 2001-262162 A1 | 9/2001 |
| JP | 2001-347154 A1 | 12/2001 |
| JP | 2002-508435 A1 | 3/2002 |
| WO | WO-94/21145 | 9/1994 |

OTHER PUBLICATIONS

Yamazaki et al., Department of Science, Hydrothermal Chemical Laboratory, University of Kochi and Kochi University School of Medicine, Kochi, Japan "Development of Continuous Autoclave by Pipeline System", Hydrothermal Chemical Experiment Report, vol. 3, No. 1 (1979).

International Search Report for PCT/JP02/02090 mailed on May 21, 2002.

International Preliminary Examination Report for PCT/JP02/02090 completed on Mar. 20, 2003.

Korean Patent Office—Office Action issued on Jul. 28, 2005.

Chinese Patent Office—Office Action for Application No. 028060857 issued on Sep. 9, 2005.

Supplementary Partial European Search Report Oct. 18, 2006.

* cited by examiner

FIG.18

| Item | Critical Point | Target Point | Wet Vapor |
|---|---|---|---|
| Pressure MPa | 22.12 | 25 | 3 |
| Temperature °C | 374.2 | 410 | 233.9 |
| Specific entropy of saturated water s' kJ/kg°C | - | - | 2.6455 |
| Difference in specific entropy s" - s' kJ/kg°C | - | - | 3.5382 |
| Dryness x | - | - | 0.7522 |
| Specific entropy s kJ/kg°C | - | 5.3069 | 5.3069 |
| Specific volume of saturated water v' m³/kg | - | - | 0.00126 |
| Difference in specific volume v" - v' m³/kg | - | - | 0.06537 |
| Specific volume v m³/kg | 0.00317 | 0.0068887 | 0.05043 |
| Density 1/v kg/dm³ | 0.3155 | 0.1452 | 0.01983 |
| Compression ratio ε = v/v₀ | - | 1 | 7.326 |

Wet vapor for generation of supercritical water (for target pressure 25 MPa and temperature 410)

FIG.19

| Substance | Critical temperature (° C) | Critical pressure (MPa) | Critical density (g/cm$^3$) |
|---|---|---|---|
| Carbon dioxide | 31.1 | 7.37 | 0.468 |
| Nitrous oxide | 36.5 | 7.24 | 0.452 |
| Freon 12 | 111.8 | 4.13 | 0.558 |
| Freon 13 | 28.9 | 3.92 | 0.578 |
| Ethane | 32.3 | 4.88 | 0.205 |
| Ethylene | 9.3 | 5.04 | 0.214 |
| Propane | 96.7 | 4.24 | 0.217 |
| Propylene | 91.9 | 4.62 | 0.214 |
| Butane | 152.1 | 3.80 | 0.228 |
| Hexane | 234.3 | 2.97 | 0.233 |
| Methanol | 239.5 | 8.09 | 0.272 |
| Ethanol | 243.1 | 6.38 | 0.276 |
| Benzene | 289.0 | 4.89 | 0.302 |
| Toluene | 318.6 | 4.11 | 0.292 |
| Ammonia | 132.5 | 11.27 | 0.235 |
| Water | 374.2 | 22.06 | 0.323 |

FIG.20

| Item | Critical Point | Target Point | Wet Vapor |
|---|---|---|---|
| Pressure MPa | 4.1 | 4.9 | 0.7 |
| Temperature °C | 111.8 | 130.0 | 40.0 |
| Specific entropy of saturated water s' kJ/kg°C | - | - | 4.3191 |
| Difference in specific entropy s" - s' kJ/kg°C | - | - | 4.7328 |
| Dryness x | - | - | 0.9291 |
| Specific entropy s' kJ/kg°C | - | 4.7035 | 4.7035 |
| Specific volume of saturated water v' m³/kg | - | - | 0.0008 |
| Difference in specific volume v" - v' m³/kg | - | - | 0.0184 |
| Specific volume v m³/kg | - | 0.0027 | 0.0171 |
| Density 1/v kg/dm³ | - | 0.3704 | 0.0585 |
| Compression ratio $\varepsilon = v/v_0$ | - | 1 | 6.41 |

Wet vapor for generation of supercritical Freon 12 (for target pressure 4.9 MPa and temperature 130)

REACTION APPARATUS FOR ORGANIC AND/OR OTHER SUBSTANCES EMPLOYING SUPERCRITICAL FLUID OR SUBCRITICAL FLUID

TECHNICAL FIELD

The present invention relates to a reaction apparatus for organic and/or other substances employing supercritical fluid(s) or subcritical fluid(s). More specifically, the present invention relates to a reaction apparatus using supercritical fluid(s) and/or subcritical fluid(s) for reactive treatment or decomposition of reactant substance(s); biomass(es) and/or other such organic substance(s) and/or the like being employed as such reactant substance(s).

BACKGROUND ART

Conventionally proposed as physicochemical reactive decomposition methods for biomass and other such organic substances and the like, there are—in addition to known chemical oxidation methods, photooxidation methods, combustion methods, and hydrothermal methods—decomposition-type treatment methods employing supercritical fluids such as are disclosed at Japanese Patent Application Publication Kokoku No. H1-38532 (1989) and so forth.

Unlike reactive hydrothermal methods employing low-temperature conditions of 200° to 300° C. as reaction conditions, such decomposition-type treatment methods for organic substances and the like employing supercritical fluids use supercritical water at conditions exceeding the critical pressure of 218 atmospheres and the critical temperature of 374° C. of water to decompose organic substances and other such reactant substances. This supercritical water possesses excellent advantages such as the fact that the polar nature thereof can be controlled based on temperature and pressure, permitting solubilization of paraffinic hydrocarbons, benzene, and other such nonpolar substances; the fact that it displays extremely excellent properties as reaction solvent for oxidative decomposition of organic matter in that it mixes in arbitrary ratios even with oxygen and other such gases, and also the fact that because it is possible to raise temperature to the critical temperature or higher using only heat of oxidation where the fractional carbon content of the material being decomposed is several percent, it is extremely excellent from a thermal energy standpoint as well; and the fact that by using supercritical water it is possible through hydrolytic reaction and/or thermolytic reaction to more or less completely decompose almost any kind of decomposition-resistant organic matter, poisonous organic matter, or the like.

Conventional reactive decomposition methods employing supercritical fluids are carried out according to the following sequence. To wit, three fluids or sets of fluids—these being water including organic substance(s) and/or other such reactant substance(s); oxygen and/or other such oxidant fluid(s); and supercritical fluid(s)—are supplied in previously mixed state(s) or partially mixed state(s) to reaction vessel(s) carrying out supercritical hydration reaction(s), and the material in question is decomposed through oxidative process(es) under conditions which are supercritical with respect to water. By further causing oxidation reaction(s) to proceed, it is also possible for the material in question to be processed as far as carbon monoxide, hydrogen, and/or the like.

Conventional reaction apparatuses employing supercritical fluids have in common the fact that fluid(s) are pressurized and are thereafter heated, causing fluid(s) to assume supercritical state(s) or subcritical state(s)—such state(s) being high-temperature, high-pressure state(s)—as a result of which reaction is made to occur. This being the case, a great deal of energy is required when fluid(s) are made to assume high-temperature, high-pressure state(s).

Methods for reducing energy during pressurization in the case of supercritical-fluid and/or subcritical-fluid high-temperature, high-pressure fluid(s) include the development of the continuous autoclave utilizing the pipeline system (Nakamichi Yamasaki, *Suinetsu Kagaku Jikkensho Houkoku*, Vol. 3 1-4 (1979). In this method, piston(s) and cylinder(s) are used to recover pressure from post-treatment high-temperature, high-pressure fluid(s); and reduction in energy during pressurization of unpressurized fluid(s) is achieved through use of other piston(s) and cylinder(s) linked to piston(s) used for recovery.

For reducing energy during pressurization in the case of supercritical-fluid and/or subcritical-fluid high-temperature, high-pressure fluid(s), there is also the method using the apparatus disclosed at Japanese Patent Application Publication Kokai No. H12-233127 (2000). This apparatus is provided with second drive means accepting the load of the driving force from first drive means employing piston(s) within cylinder(s) to receive pressure from post-treatment high-temperature, high-pressure fluid(s) and transmitting same as force to pressurize pre-treatment fluid(s). That is, the apparatus is such that, after being reduced using back pressure valve(s), energy of post-treatment high-pressure fluid(s) is introduced into cylinder(s) at the aforesaid first drive means. The apparatus is such that this permits fluid(s) including reactant substance(s) to be made to assume high temperature(s) and high pressure(s) and to be supplied in stable fashion to reaction system(s).

Furthermore, because supercritical fluid(s) and/or subcritical fluid(s) are at high temperature and high pressure, decomposition reaction(s) and so forth occurring within fluid(s) proceed extremely rapidly. For this reason, it is necessary to employ short time(s) for treating reactant substance(s) with supercritical fluid(s) and/or subcritical fluid(s) and to quickly stop the rapid reactions which occur within supercritical fluid(s) and/or within subcritical fluid(s).

Methods for shortening time for rapid treatment of reactant substance(s) with supercritical-fluid and/or subcritical-fluid high-temperature, high-pressure fluid(s) include methods employing continuous reaction apparatuses for cellulose hydrolysis (M. Sasaki, B. Kabyemela, R. Malaluan S. Hirose, N. Takeda, T. Adschiri, K. Arai; Cellulose hydrolysis in sub-critical and supercritical water, J. Supercrit. Fluids 1998. 13. 261-268.). This method is carried out using a flow-type reaction apparatus, treatment of reactant substance(s) being carried out according to the following sequence. To wit, reactant substance(s) are directly mixed in the vicinity of reaction vessel inlet(s) with supercritical water which has been heated and pressurized under prescribed conditions, rapidly raising the temperature thereof until target optimum reaction temperature(s) are reached. Furthermore, at reaction vessel outlet(s), rapid cooling is carried out through external cooling by direct delivery of cold water to reaction liquid(s). In such case, shortening of the time for treating reactant substance(s) with supercritical water is made possible by reducing reaction vessel volume and/or increasing flow rate.

However, the reality at present is that there is not yet an industrial reaction apparatus for handling supercritical state(s) of high-temperature, high-pressure fluid(s), such as would permit recovery of energy as well as treatment of reactant substance(s) with supercritical fluid(s) in extremely short period(s) of time, and such as would also permit the aforementioned conventional reaction(s) of organic substance(s) and/or the like with supercritical fluid(s) to be implemented efficiently.

With conventional reaction apparatuses for organic substance(s) and/or the like employing supercritical fluid(s), e.g., where reactant substance(s) are wood meal and/or other such organic substance(s), water under high pressure and wherein organic substance(s) have been dispersed is rapidly heated and is maintained in supercritical and/or subcritical state(s) for fixed period(s) of time, hydrolytic reaction(s) occurring while in such supercritical and/or subcritical state(s) permitting saccharification reaction(s) to be carried out wherein wood meal and/or other such organic substance(s) are made into glucose and/or other such low-molecular-weight sugar(s). In order to prevent the low-molecular-weight saccharide(s) produced after the conclusion of such saccharification reaction(s) from being decomposed further, it is necessary to rapidly cool the high-temperature supercritical water and/or subcritical water and stop the reaction(s). Such saccharification reaction(s) may be carried out using either a batch-type apparatus or a flow-type apparatus. Conventionally proposed reaction apparatuses, where implemented in the context of flow-type apparatuses, make use of apparatus constitutions employing processes wherein realization of high-temperature supercritical water state(s) occurs as a result of mixing of low-temperature, supercritical-pressure water wherein wood meal is dispersed with high-temperature supercritical water and causing reaction(s) to proceed, and wherein stopping of such reaction(s) is carried out through injection of cold water therein.

However, when carrying out the aforesaid processes with such conventional reaction apparatuses, problems such as the following remain.

(1) Apparatus constitution requires pressurizing, heating, reacting, cooling, and decompressing vessels into which water is sequentially introduced, making apparatus constitution complicated overall.
(2) Because time for saccharification reaction of ligneous and/or other such organic substance(s) is short, cold water must be mixed therewith to stop reaction. If reaction time is increased, reactant substance(s) are overdecomposed, preventing sugars from being obtained.
(3) Because reaction is stopped by rapid cooling with cold water, much water is used. For this reason, the process of concentrating sugar(s) following reaction is made complicated.
(4) The fact that the cooling process is carried out using cold water means that energy consumption is high.
(5) It is difficult to achieve distribution in such state that ligneous and/or other such organic substance(s) are uniformly dispersed in water at high pressure.

It is therefore an object of the present invention to provide a reaction apparatus for organic and/or other substance(s) employing supercritical fluid(s) and/or subcritical fluid(s) permitting injection of organic substance(s) and/or other reactant substance(s) in homogeneous state(s) to reactor(s) and permitting treatment of reactant substance(s) with supercritical fluid(s) to occur in extremely brief period(s) of time, and also permitting actuation to occur in industrial fashion and at high energy efficiency.

DISCLOSURE OF INVENTION

In order to achieve the aforesaid object(s), a reaction apparatus for organic and/or other substance(s) employing supercritical fluid(s) and/or subcritical fluid(s) in accordance with the present invention is characterized in that means for compressing vapor(s) and obtaining supercritical fluid(s) and/or subcritical fluid(s), means for bringing such supercritical fluid(s) and/or subcritical fluid(s) into contact with organic matter and/or other reactant substance(s) and causing occurrence of chemical reaction(s), and means for causing expansion and decompression of fluid(s) including product(s) produced as a result of such chemical reaction(s) comprise cylinder(s) and piston(s) provided at such cylinder(s), the reaction apparatus being made to actuate in periodic fashion by actuating such piston(s) to cause compression of fluid(s); actuating piston(s) in reverse direction(s) following chemical reaction(s) involving reactant substance(s) and lowering temperature(s) and pressure(s); and removing, from cylinder(s), fluid(s) including product(s) obtained and delivering new charge(s) of vapor(s) to cylinder(s).

Here, the aforesaid cylinder(s) and piston(s) are reciprocating-type reactor(s), and from a functional standpoint, are of the exact same physical type as plunger-type apparatuses wherein plunger(s) engage in reciprocating motion within cylinder(s). Reaction apparatus(es) in accordance with the present invention are such that pressurization, heating, reaction, cooling, and decompression take place within the same cylinder(s) as a result of operation of piston(s) at cylinder(s). This being the case, simplification of the reaction apparatus is made possible.

A reaction apparatus in accordance with the present invention employs piston(s) to adiabaticly compress vapor(s) introduced into cylinder(s) and attain supercritical and/or subcritical state(s) of fluid(s). Thereafter, piston(s) are again driven, adiabatic expansion of fluid(s) causing cooling of supercritical and/or subcritical state(s) of such fluid(s). At such time, by converting vertical motion of piston(s) into rotary motion or the like and adjusting speed(s) thereof, it is possible to suppress overdecomposition of reactant substance(s) with a "resolution" which is such that reaction(s) occurring in supercritical and/or subcritical fluid(s) are divided into extremely brief period(s) of time, and to quickly stop (freeze) reaction(s) without admixture of low-temperature liquid(s) (cold water in the case where the fluid is water) therewith. As a result, because low-temperature fluid(s) are not used, concentration(s) of sugar(s) and/or the like which constitute the product(s) obtained can be maintained at high levels.

Moreover, converting the work represented by adiabatic expansion at piston(s) into rotary motion or the like permits same to be reused as work for adiabatic compression, permitting treatment with little consumption of energy even where reaction(s) of substance(s) being treated must be controlled with a "resolution" which is divided into extremely brief period(s) of time on the order of seconds or less.

Supercritical-fluid temperature and pressure conditions realized inside the apparatus of the present invention may be freely controlled based on fluid compression ratio(s), temperature(s) of saturated vapor(s) introduced thereinto, and amount(s) of liquid(s) (water in the case where the fluid is water) added. In addition, because introduction of substance(s) being treated into reactor(s) is carried out using nozzle(s) to spray same at high pressure together with liquid(s) at stage(s) where saturated vapor(s) of fluid(s) are introduced into cylinder(s) and/or during mid-compression of vapor(s), introduction can be carried out such that substance(s) being treated are homogeneously dispersed in reactor(s).

In reaction apparatus(es) in accordance with the present invention, as examples of fluids which may attain supercritical state(s)—in addition to water—carbon dioxide, nitrous oxide, Freon 12, Freon 13, ethane, ethylene, propane, propylene, butane, hexane, methanol, ethanol, benzene, toluene, ammonia—and a wide variety of other substances in addition thereto—may be cited.

Vapor(s) in reaction apparatus(es) in accordance with the present invention may be vapor(s) of any of the aforesaid varieties of fluids, and may be obtained using boiler(s) or the like. Compressive action occurring within reactor(s) into which such fluid vapor(s) have been introduced causes same to assume supercritical state(s). Such compression causes high-temperature, high-pressure fluid(s) in target supercritical and/or subcritical state(s) to be produced in short period(s) of time when piston(s) are near top dead center. Contact between such high-temperature, high-pressure fluid(s) and reactant substance(s) causes hydrolytic reaction(s) and/or the like to occur at reactant substance(s), and this permits reactant substance(s) to be decomposed and/or the like.

While the time during which high-temperature, high-pressure fluid(s) in supercritical and/or subcritical state(s) and reactant substance(s) must be in contact for such reaction(s) to occur varies with temperature(s) and pressure(s) reached by fluid(s), this will often be an extremely brief period of time anywhere from several minutes to several seconds or less. In reaction apparatus(es) in accordance with the present invention, temperature(s) and pressure(s) of target [value(s)] or greater might for example be attained for approximately ½oth of the stroke(s) of the piston(s) in the reactor(s), and if dwell time(s) thereat were to be made to be 0.01 sec this would work out to be approximately 300 rpm. Because this is a rotational velocity more than capable of being realized by an engine of identical composition, it is more than possible to realize treatment times on the order of seconds or less. Furthermore, through repeated reaction of the same reactant material it is also more than possible to realize reactions occurring on the order of several minutes.

Supercritical conditions for fluid(s) in reaction apparatus(es) in accordance with the present invention include supercritical fluid(s) and subcritical fluid(s). For example, while both the temperature and the pressure of a supercritical fluid might be in supercritical states, the temperature or the pressure of a subcritical fluid might be at supercritical conditions, which would mean that conditions are calmer than supercritical conditions. Accordingly, with respect to reaction conditions, selection of supercritical fluid(s) and subcritical conditions should be carried out as appropriate based on type(s) of reactant substance(s), type(s) of reaction product(s), and so forth.

As stated above, high-temperature, high-pressure fluid(s) at reactor(s) in reaction apparatus(es) in accordance with the present invention are thereafter rapidly cooled by rapid expansion of cylinder volume(s) or the like due to piston(s) or the like. This rapid cooling causes chemical reaction(s) of reactant substance(s) to be frozen (forcibly stopped). This freezing of reaction(s) may be carried out in extremely brief period(s) of time, as was the case with the aforesaid compression process(es). Product(s) are moreover discharged from reactor interior(s) together with vapor(s) when piston(s) are near bottom dead center.

Reaction apparatus(es) in accordance with the present invention may be constituted such that driving of piston(s) causes vapor(s) to be compressed at only one side within cylinder(s).

Reaction apparatuses for organic and/or other substance(s) employing supercritical fluid(s) and/or subcritical fluid(s) in accordance with the present invention include constitutions wherein delivery of new charge(s) of vapor(s) to cylinder(s) only involves saturated vapor(s), saturated fluid liquid(s) or cold fluid(s) being injected into cylinder(s) together with reactant substance(s) during initiation of compression by piston(s), in mid-compression, or following conclusion of compression.

Reaction apparatuses for organic and/or other substance(s) employing supercritical fluid(s) and/or subcritical fluid(s) in accordance with the present invention include constitutions wherein volume(s), at which vapor compression is carried out, formed by piston(s) and cylinder(s) are provided to either side of piston(s), and/or constitutions wherein compressor-expander(s) is or are provided to either side of piston(s), with injector(s) (feedstock spray apparatus(es)) being provided at each thereof.

Reaction apparatuses for organic and/or other substance(s) employing supercritical fluid(s) and/or subcritical fluid(s) in accordance with the present invention include constitutions wherein wet vapor(s) are compressed by one of volumes or sets of volumes, at which compression of vapor(s) is carried out, formed by piston(s) and cylinder(s) and provided to either side of piston(s), the other of volumes or sets of volumes being maintained at high pressure(s).

Reaction apparatuses for organic and/or other substance(s) employing supercritical fluid(s) and/or subcritical fluid(s) in accordance with the present invention include constitutions wherein, at mechanism(s) comprising cylinder(s) and piston(s) provided at such cylinder(s), work of piston(s) is recovered. Recovery of work of piston(s) makes it possible to drive reactor(s) with high energy efficiency.

Reaction apparatus(es) for organic and/or other substance(s) employing supercritical fluid(s) and/or subcritical fluid(s) in accordance with the present invention include constitutions wherein means for compressing vapor(s) and obtaining supercritical fluid(s) and/or subcritical fluid(s), means for bringing supercritical fluid(s) and/or subcritical fluid(s) into contact with organic matter and/or other reactant substance(s) and causing occurrence of chemical reaction(s), and means for causing expansion and decompression of fluid(s) including product(s) produced as a result of chemical reaction(s) comprise rotor chamber(s) and rotor(s) provided at such rotor chamber(s), the reaction apparatus being made to actuate in periodic fashion by rotating such rotor(s) within rotor chamber(s) to cause compression of vapor(s); further rotating rotor(s) following the aforesaid chemical reaction(s) and lowering temperature(s) and pressure(s), and removing, from rotor chamber(s), fluid gas(es) and/or liquid(s) including product(s) obtained and delivering new charge(s) of vapor(s) to rotor chamber(s).

Compared with reciprocating mechanism(s) comprising cylinder(s) and piston(s) provided at such cylinder(s), rotary mechanism(s) comprising rotor chamber(s) and rotor(s) provided at such rotor chamber(s) possess the advantage that compression and expansion of substance(s) to be treated which are introduced into rotor chamber(s) can be carried out more rapidly, as well as the fact that reductions in size and weight can be achieved.

Reaction apparatuses for organic and/or other substance(s) employing supercritical fluid(s) and/or subcritical fluid(s) in accordance with the present invention include constitutions wherein means for compressing vapor(s) and obtaining supercritical fluid(s) and/or subcritical fluid(s), means for bringing supercritical fluid(s) and/or subcritical fluid(s) into contact with organic matter and/or other reactant substance(s) and causing occurrence of chemical reaction(s), and means for causing expansion and decompression of fluid(s) including product(s) produced as a result of chemical reaction(s) comprise turbocompressor(s) and turbine(s) directly coupled to such turbocompressor(s); operation of turbocompressor(s) causing compression of vapor(s), temperature(s) and pressure(s) being lowered by way of turbine(s) following conclusion of chemical reaction(s), and motive force(s) being recovered as a result of direct coupling of turbocompressor(s) and turbine(s) extracting therefrom fluid(s) including product(s) obtained. Such constitutions are for continuous reaction of reactant substance(s).

Reaction apparatuses for organic and/or other substance(s) employing supercritical fluid(s) and/or subcritical fluid(s) in accordance with the present invention include constitutions provided with means for causing fluid(s) including product(s) obtained from reaction(s) to be separated into saturated fluid(s) and saturated vapor fluid(s) by cyclone separator(s) and/or centrifugal separator(s).

Included among reaction apparatuses for organic and/or other substance(s) employing supercritical fluid(s) and/or subcritical fluid(s) in accordance with the present invention there are constitutions provided with explosive disintegration apparatus(es) that rapidly depressurize reactant substance(s) while same is or are immersed in high-pressure saturated fluid(s); reactant substance(s) being pulverized by such explosive disintegration apparatus(es). This is for making it possible, through pulverization, to easily and quickly introduce reactant substance(s) into the reaction apparatus of the present invention.

Included among reaction apparatuses for organic and/or other substance(s) employing supercritical fluid(s) and/or subcritical fluid(s) in accordance with the present invention are constitutions wherein passage switching valve(s) and/or other such open-/close-type member(s) are respectively provided at introductive port(s) and scavenging valves(s) in mechanism(s) comprising cylinder(s), rotor chamber(s), and/or turbocompressor(s) and piston(s) for such cylinder(s), rotor(s) for such rotor chamber(s), and/or turbine(s) for such turbocompressor(s); such open-/close-type member(s) being such as to allow setting of open and/or closed time(s) thereof, and setting of such open-/close-type member(s) so as to cause closure thereof for fixed period(s) of time permitting supercritical treatment at such mechanism(s) to be carried out continuously and in ongoing fashion.

Setting of respective open-/close-type member(s) at such mechanism(s) so as to cause closure thereof for fixed period(s) of time makes it possible to cause reaction of organic and/or other substance(s) by supercritical fluid(s) and/or subcritical fluid(s) to be carried out continuously and repeatedly at the same mechanism(s), as a result of which it is possible to react to completion those substance(s) being treated which require long times.

Reaction apparatuses for organic and/or other substance(s) employing supercritical fluid(s) and/or subcritical fluid(s) in accordance with the present invention include constitutions wherein mechanism(s) comprising cylinder(s), rotor chamber(s), and/or turbocompressor(s) and piston(s), rotor(s), and/or turbine(s) for same are such that a plurality thereof are provided. Ways of increasing reaction yield(s) of reaction(s) include, in addition to formation of multiple banks of cylinders and/or the like, provision of a plurality of such mechanisms.

In the case of the foregoing latter constitution, this may be constituted such that scavenger member(s) and member(s) introducing vapor(s) into respective cylinder(s), respective rotor chamber(s), and/or respective turbocompressor(s) in mechanism(s) comprising cylinder(s), rotor chamber(s), and/or turbocompressor(s) and piston(s), rotor(s), and/or turbine(s) for same, there being a plurality thereof, are sequentially coupled by way of passage coupling valve(s) and/or other such open-/close-type member(s); permitting respective processes performed by means for compressing vapor(s) and obtaining supercritical fluid(s) and/or subcritical fluid(s), means for bringing supercritical fluid(s) and/or subcritical fluid(s) into contact with organic matter and/or other reactant substance(s) and causing occurrence of chemical reaction(s), and means for causing expansion and decompression of fluid(s) including product(s) produced as a result of chemical reaction(s) to be carried out a plurality of times. This is for, where reactant substance(s) are to undergo supercritical treatment for long times on the order of minutes, opening the aforesaid open-/close-type member(s) as needed and causing supercritical treatment in accordance with the present invention to be carried out repeatedly and continuously.

Reaction apparatuses for organic and/or other substance(s) employing supercritical fluid(s) and/or subcritical fluid(s) in accordance with the present invention include constitutions provided with oxidant-introducing apparatus(es) permitting introduction of oxidant(s) into cylinder(s), rotor chamber(s), and/or turbocompressor(s); introduced organic matter and/or other reactant substance(s) being oxidatively decomposed while in supercritical and/or subcritical state(s).

Moreover, reaction apparatuses for organic and/or other substance(s) employing supercritical fluid(s) and/or subcritical fluid(s) in accordance with the present invention include constitutions provided with gasification apparatus(es) further separating, into gas component(s) and vapor component(s), saturated vapor(s) separated from fluid(s) including product(s).

Included among reaction apparatuses for organic and/or other substance(s) employing supercritical fluid(s) and/or subcritical fluid(s) in accordance with the present invention are constitutions provided with ethanol fermentor(s) having yeast(s), colon bacillus or bacilli, and/or other such microorganism(s) into which, where product(s) are glucose and/or other such low-molecular-weight sugar(s) and/or the like obtained from decomposition of biomass(es) and same is or are introduced thereinto; sugar substrate(s) introduced into ethanol fermentor(s) being converted as far as ethanol by the aforesaid microorganism(s).

Furthermore, included among reaction apparatuses for organic and/or other substance(s) employing supercritical fluid(s) and/or subcritical fluid(s) in accordance with the present invention are constitutions provided with ABE fermentor(s) having ABE fermentation microorganism(s) into which, where product(s) are low-molecular-weight sugar(s) and/or the like obtained from decomposition of biomass(es) and same is or are introduced thereinto; sugar substrate(s) introduced into ABE fermentor(s) being decomposed as far as acetone, butanol, and ethanol by ABE fermentation microorganism(s). With ABE fermentor(s), in comparison with the aforesaid conventional methods, ethanol and/or other such low-molecular-weight sugar(s) and/or other such substrate(s) produced as a result of contact with supercritical fluid(s) can be broken down into lower-molecular-weight molecule(s) and solubilized in fluid(s) more efficiently and with less consumption of energy; and moreover, ABE fermentation microorganism(s) permit treatment to be carried out such that conversion proceeds as far as acetone, butanol, and ethanol.

Included among reaction apparatuses for organic and/or other substance(s) employing supercritical fluid(s) and/or subcritical fluid(s) in accordance with the present invention are constitutions provided with methane fermentor(s) having methane fermentation microorganism(s) into which, where product(s) are low-molecular-weight product component(s) obtained from decomposition of biomass(es) and same is or are introduced thereinto; substrate(s) broken down into lower-molecular-weight molecule(s) which are introduced into methane fermentor(s) being converted as far as methane gas by methane fermentation microorganism(s). With methane fermentor(s), in comparison with the aforesaid conventional methods, biomass(es) can be broken down into lower-molecular-weight molecule(s) and solubilized in fluid(s) as a result of contact with supercritical fluid(s) more efficiently and with less consumption of energy; and moreover, methane microorganism(s) permit conversion to proceed as far as methane gas.

Reaction apparatus(es) for organic and/or other substance(s) employing supercritical fluid(s) and/or subcritical fluid(s) in accordance with the present invention permit decomposition treatment where biomass feedstock(s) including municipal refuse is or are employed as reactant substance(s). That is, this is the case where reactant substance(s) are sugar(s) obtained as a result of decomposition of biomass(es). This is the case where reactant substance(s) is or are any substance(s) selected from among biomass feedstock(s) including municipal refuse, discarded tire(s), coal and/or other such carbon-containing substance(s); and product(s) is or are synthesized gas(es) including methane gas, hydrogen, carbon dioxide, and carbon monoxide obtainable through decomposition of the aforesaid selected substance(s). This is the case in constitutions wherein reactant substance(s) is or are PET bottle(s) and/or other such high-molecular-weight polymer(s), and product(s) is or are high-molecular-weight-polymer-material feedstock substance(s); this is the case where reactant substance(s) is or are PCB(s), R-series refrigerant(s), DXN(s) (dioxin(s)), and/or other such substance(s) having decomposition-resistant content, and reactant substance(s) is or are decomposed and rendered harmless; and this is the case where reactant substance(s) is or are waste cooking oil(s) and/or other such fat(s) and/or oil(s) which is or are converted into fatty acid ester(s) by supercritical fluid(s) and/or subcritical fluid(s).

BRIEF DESCRIPTION OF DRAWINGS

FIG. 18 is a drawing showing values for compression ratio $\epsilon$ calculated for a situation where the pressure of the wet vapor prior to compression is 3 MPa and for the state existing at the target point when the fluid medium is water.

FIG. 19 is a drawing showing critical conditions for various fluid media.

FIG. 20 is a drawing showing values for compression ratio $\epsilon$ calculated for a situation where the pressure of the wet vapor prior to compression is 3 MPa and for the state existing at the target point when the fluid medium is Freon 12.

BEST MODE OF CARRYING OUT INVENTION

Figure 1:
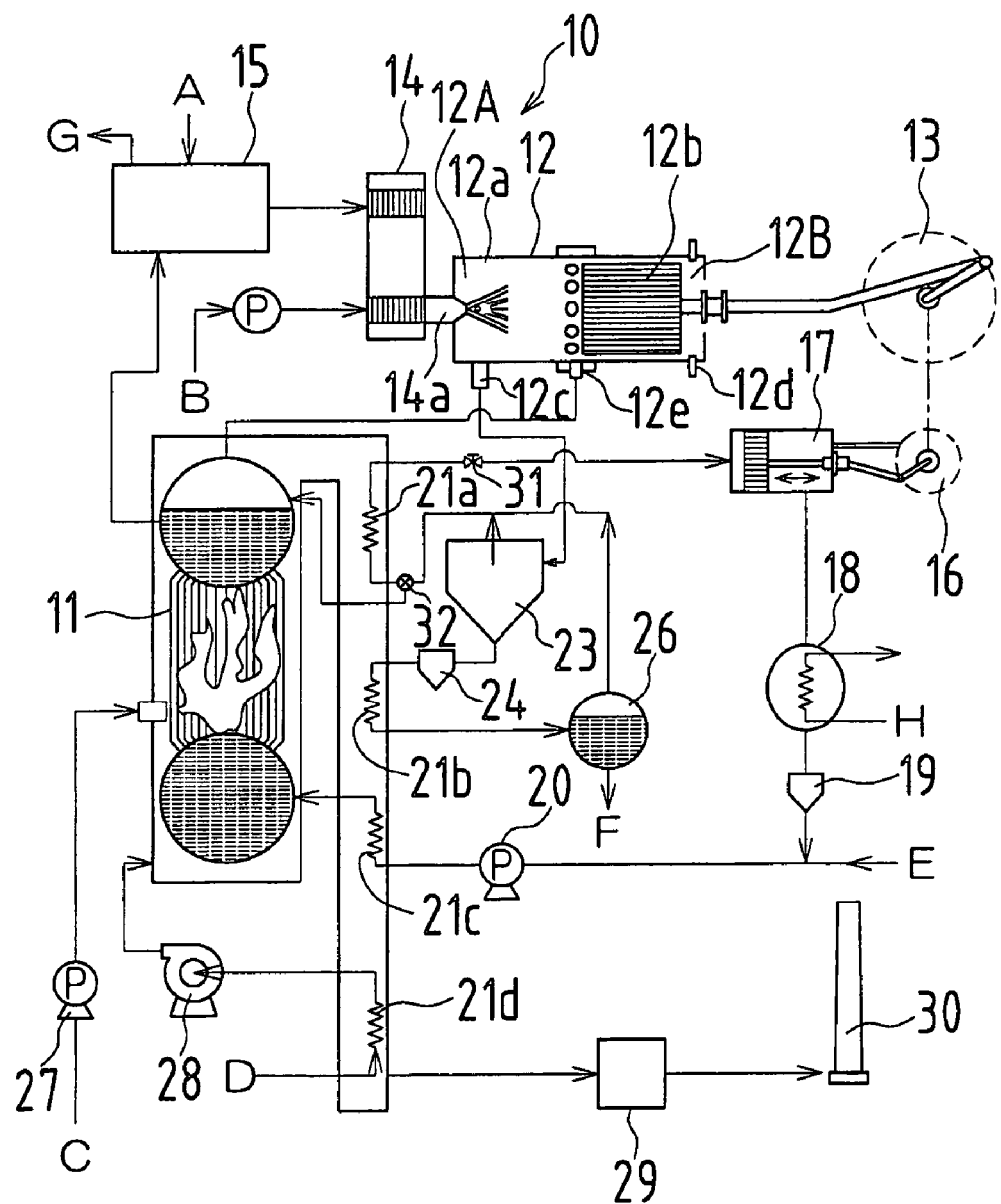
FIG. 1 is a flowchart of a reaction apparatus for organic and/or other substances employing supercritical fluid(s) and/or subcritical fluid(s) in accordance with the present invention.

Next, best mode(s) of carrying out the present invention are described with reference to the drawings. Reaction apparatus 10 for organic and/or other substances employing supercritical fluid(s) and/or subcritical fluid(s) and shown in FIG. 1 uses water as fluid medium. Reaction apparatus 10 has as its basic component reciprocating-type reactor 12 which is made up of boiler 11 for obtaining vapor from water; means for compressing this vapor and obtaining supercritical water and/or subcritical water; means for bringing this supercritical water and/or subcritical water into contact with organic matter and/or other reactant substance(s) and causing occurrence of chemical reaction(s); and means for causing expansion and decompression of water including product(s) produced as a result of such chemical reaction(s).

Boiler 11 is employed to obtain vapor from water. Fuel C is supplied to boiler 11 from pump 27, while at the same time, air D is supplied thereto by blower 28. This water vapor is introduced into reactor 12.

At reactor 12, water vapor from water may be compressed. That is, reactor 12 is a high-pressure compressor-expander comprising cylinder 12a and piston 12b provided at such cylinder 12a. Provided to either side of piston 12b are volumes 12A and 12B. Piston 12b is actuated by means of crank mechanism 13 and water vapor is compressed at volume 12A, permitting formation of supercritical water and/or subcritical water. In addition, this supercritical water and/or subcritical water is brought into contact with wood meal serving as reactant substance, making it possible to cause wood meal to be made to undergo hydrolytic reaction(s). Note that crank mechanism 13 may also be a cam mechanism.

This wood meal is such that ligneous chips A are explosively disintegrated by explosive disintegrator 15, pulverizing wood meal. This wood meal is introduced into rotary feeder 14, while at the same time, water B is delivered to rotary feeder 14 in a pressurized state by means of a pump. As wood meal diffuses throughout water at rotary feeder 14, wood meal is supplied to reactor 12 in sprayed state by means of injector 14a. The finer the wood meal the better, since this will permit facilitation of chemical reaction(s) and prevention of spray nozzle clogging. Accordingly, circumstances will be all the more favorable if wood meal is pulverized by explosive disintegration and this is furthermore made into a slurry.

The aforesaid hydrolytic reaction(s) of wood meal may be made to occur when piston 12b is in the vicinity of top dead center. Following conclusion of hydrolytic reaction(s) of wood meal, piston 12b may be actuated, causing expansion of vapor within cylinder 12a and causing same to once again become wet vapor, and also causing termination of such reaction(s) due to the decrease in temperature at such time.

Such reaction processes require neither high-temperature water nor cooling water; and furthermore, because wood meal reaction time [can be] varied by changing actuation velocity of piston 12b, control thereof is easy. Furthermore, at reactor 12, while a large amount of work is required during compression by piston 12b, operations are carried out so as to cause this work to be extracted during expansion such that cancellation occurs. In such case, because mixture and thermal transfer are not based on processes accompanied by loss of energy, the net work required is only the energy consumed during chemical reaction(s), the frictional energy at piston 12b, and various other small amounts of energy such as that of the pump(s) and so forth. Accordingly, actuation can be carried out with high energy efficiency.

Descension of piston 12b causes port 12c to open at appropriate time(s), actuation being made to occur so as to expel reaction products together with wet vapor. Such operation of reactor 12 permits actuation to occur in the context of two-cycle and/or four-cycle mechanism(s). For example, because it is alright if scavenging is somewhat incomplete, uniflow-type two-cycle device(s) may be used as reactor 12. In such case, at cylinder 12a, port 12e might be opened by piston 12b when expansion is concluded, introducing a new charge of vapor, and used vapor might be discharged from valve 12c on the opposite side therefrom.

Delivery of new charges of vapor to chamber 12A of cylinder 12a might only involve saturated vapor; it being possible for saturated liquid or cold water to be injected into compressor-expander 12 together with wood meal during initiation of compression by piston 12b, in mid-compression, or following conclusion of compression. Saturated vapor at such time might be such that obtained from boiler 11 is supplied to the interior of cylinder 12a.

The liquid fraction at boiler 11, i.e., cold water, might be sprayed into cylinder 12a simultaneous with supply of saturated vapor to reactor 12 or during the course of compression, permitting adjustment of the dryness of the vapor within cylinder 12a. If this vapor dryness should become too low, it is because the amount of cooling water being sprayed is too small.

Injection into cylinder 12a might be carried out such that a fixed amount of wood meal is in a homogeneously dispersed state within the jetted stream at the time of such spraying of cold water. Because fine wood meal can be dispersed in this spray due to the fact that cold water can be sprayed at high velocity, and because wood meal can be propelled with saturated liquid, it is possible to prevent occurrence of clogging of spray nozzle(s). Furthermore, the reason that cold water is used for spraying is to impart wood meal with the required wetness, and also to prevent thermal decomposition of wood meal within cylinder 12a by maintaining the wood meal at low temperature (150° C. or lower being preferred).

Included among reaction apparatuses in accordance with the present invention there are, moreover, constitutions provided with means for causing water including product(s) obtained from chemical reaction(s) to be separated into saturated water and saturated vapor by cyclone separator(s) 23 (and/or centrifugal separator(s)).

That is, low-pressure wet vapor discharged from cylinder 12a is delivered to cyclone separator 23, and water including products obtained as a result of chemical reaction is separated into saturated water and saturated vapor. At such time, low-pressure saturated vapor produced as a result of separation by cyclone separator 23 might be such that a portion of the heated vapor is guided to motive force generator 17 which is separately provided with flow rate adjustment valve (gauge) 31, permitting the energy therefrom to be used as motive force at reactor 12 to which cylinder 12a and piston 12b belong. 13 is a crank mechanism coupled to the end of the shaft of piston 12b; 16 is a crank mechanism for motive force generator 17; and 21a through 21d are heat exchangers. As a result hereof, overall energy efficiency of reaction apparatus 10 can be increased. Vapor used by motive force generator 17 can be condensed by condenser 18 and returned by way of filter 19 as water for supply to boiler 11.

In order to use energy from the aforesaid motive force generator 17 as motive force for reactor 12, crank mechanism 13 and crank mechanism 16 are coupled together. That is, motive force from motive force generator 17 is converted into rotary motion and is transmitted from crank mechanism 16 to crank mechanism 13, and this rotary motion is used as motive force for piston 12b at reactor 12.

Figure 2:
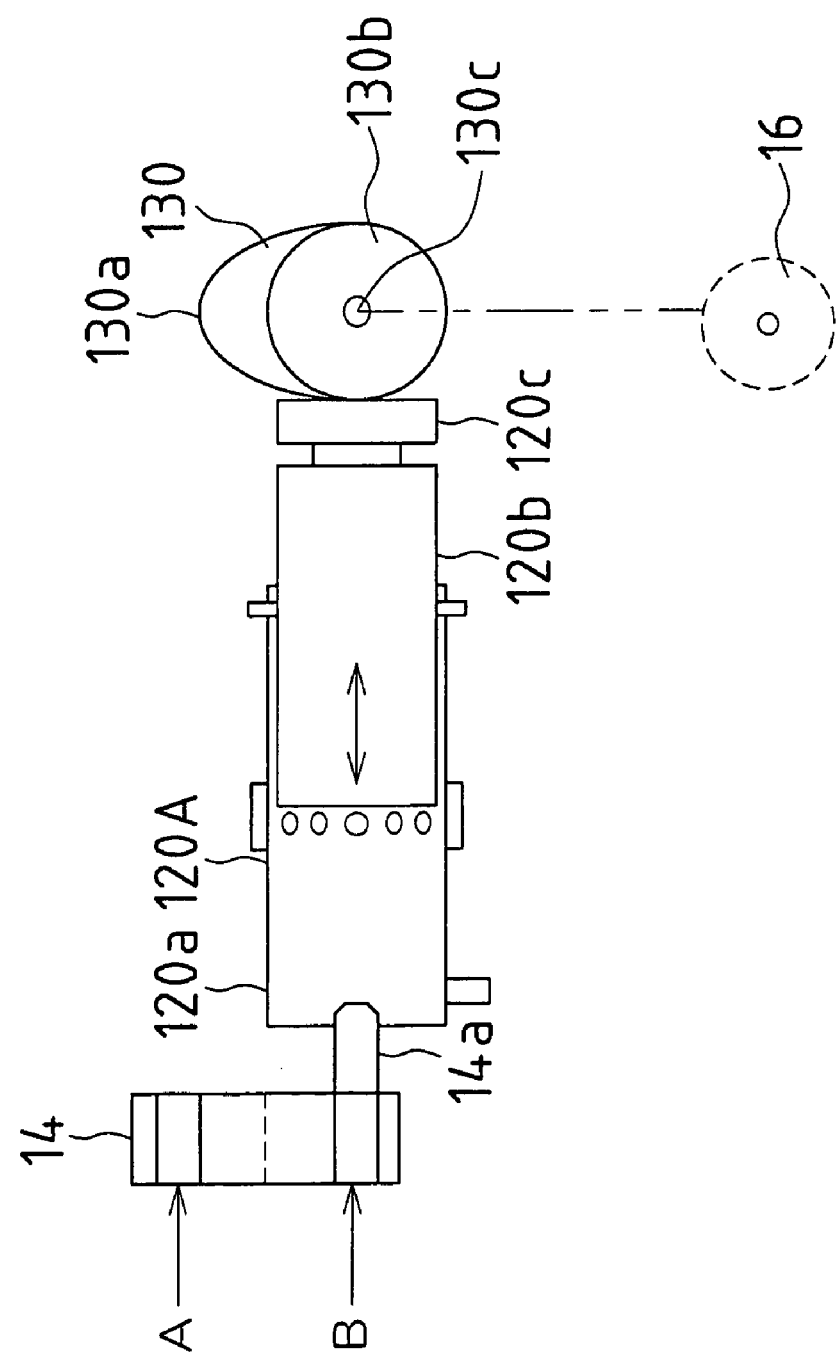
FIG. 2 is a partial flowchart in a situation where cam-type actuation mechanism(s) are employed at reactor(s) in a reaction apparatus for organic and/or other substances employing supercritical fluid(s) and/or subcritical fluid(s) in accordance with the present invention.

In such case, either or both of crank mechanisms 13 and 16 may be constituted from cam mechanism(s). FIG. 2 shows a constitution employing cam mechanism 130 in place of crank mechanism 13. Cam mechanism 130 comprises cam 130a and cam base 130b, and cam 130a abuts end region 120c of piston 120*b* at reactor 120A, permitting rotary motion of cam 130 to be converted into extensile motion of piston 120*b*. 120*a* is a cylinder.

Reaction products from cyclone separator 23 are concentrated, and are thereafter introduced into gas-liquid separator 26 and are separated into saturated vapor and saturated water. The reason that separation into saturated vapor and saturated water is carried out here is because it is expected that reaction products will be contained only within the liquid and not within the vapor. Accordingly, concentration of reaction products may be accomplished merely by further separating the heated vapor of that liquid therefrom. This makes it possible to simplify the procedure for concentrating the reaction products which are obtained. Furthermore, because reaction products are not included within saturated vapor, same may be returned to boiler 11 by means of pump 20 or may be sent to motive force recovery apparatus 17 and used as source of motive force in the same manner as described above.

Figure 3:
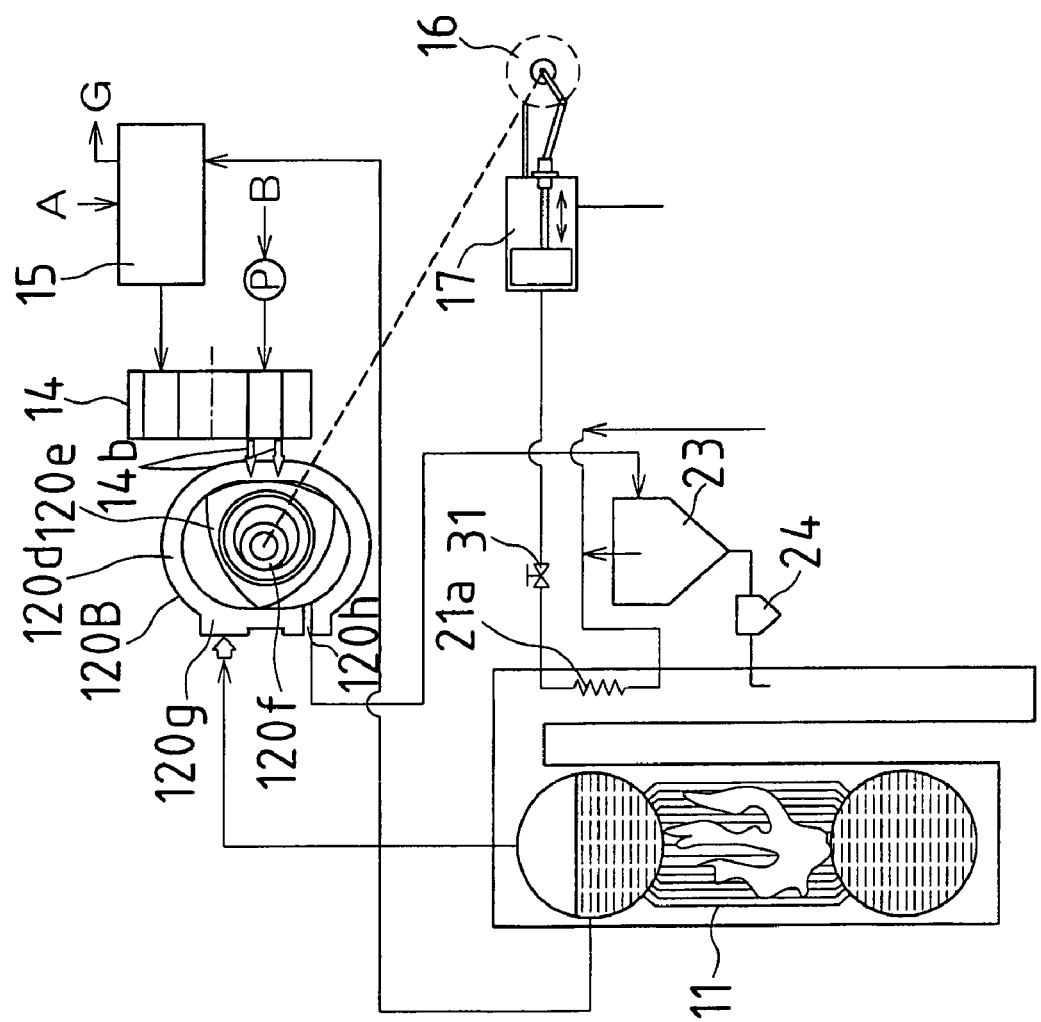
FIG. 3 is a partial flowchart in a situation where rotary-type compressor-expander(s) are used instead of reciprocating-type compressor-expander(s) in a reaction apparatus for organic and/or other substances employing supercritical fluid(s) and/or subcritical fluid(s) in accordance with the present invention.

FIG. 3 shows a constitution in which rotary-type reactor 120B is used in place of the aforesaid reactor 12. Reactor 120B comprises rotor chamber 120*d* and its rotor 120*e*. Rotor 120*e* rotates elliptically in such fashion that the outside circumferential surface thereof is inscribed by rotor chamber 120*d*. Furthermore, drive shaft 120*f* is coupled by gear at the inside circumferential region of rotor 120*e*, rotation of drive shaft 120*f* causing rotor 120*e* to rotate elliptical fashion. Other components are as described above.

At reactor 120B, elliptical rotation of rotor 120*e* causes water vapor from boiler 11 to be captured into rotor chamber 120*d* from vapor introduction hole 120*g* and to be compressed, as a result of which supercritical water and/or subcritical water is or are formed. This supercritical water and/or subcritical water and wood meal jetted from feeder 14*b* of rotary feeder 14 come into contact, and wood meal is decomposed by hydrolytic reaction(s). Thereafter, at rotor chamber 120*d*, rotor 120*e* may be rotated, expansion causing the vapor therein to once again become wet vapor, and also causing termination of chemical reaction(s) of wood meal due to the decrease in temperature at such time.

At such reaction processes, the fact that neither high-temperature water nor cooling water is required, and the fact that wood meal hydrolysis reaction rate can be easily controlled based on rotational velocity of rotor 120*e*, are the same as was the case at the aforesaid reactor 12.

At reactor 120B, low-pressure wet vapor may be discharged from discharge hole 120*h* of rotor chamber 120*d* as rotor 120*e* rotates. Moreover, this discharged low-pressure wet vapor may be delivered to cyclone separator 23, and water including products obtained as a result of chemical reaction may be separated into saturated water and saturated vapor. Moreover, rotary operation of rotor 120*e* may be directly extracted as motive force for drive shaft 120*f*, and this motive force may be once again used for rotary operation of rotor 120*e* and/or the like. Accordingly, treatment can be carried out with high energy efficiency. On this score as well, action in the present embodiment is the same as the action described above for reactor 12.

Figure 4:
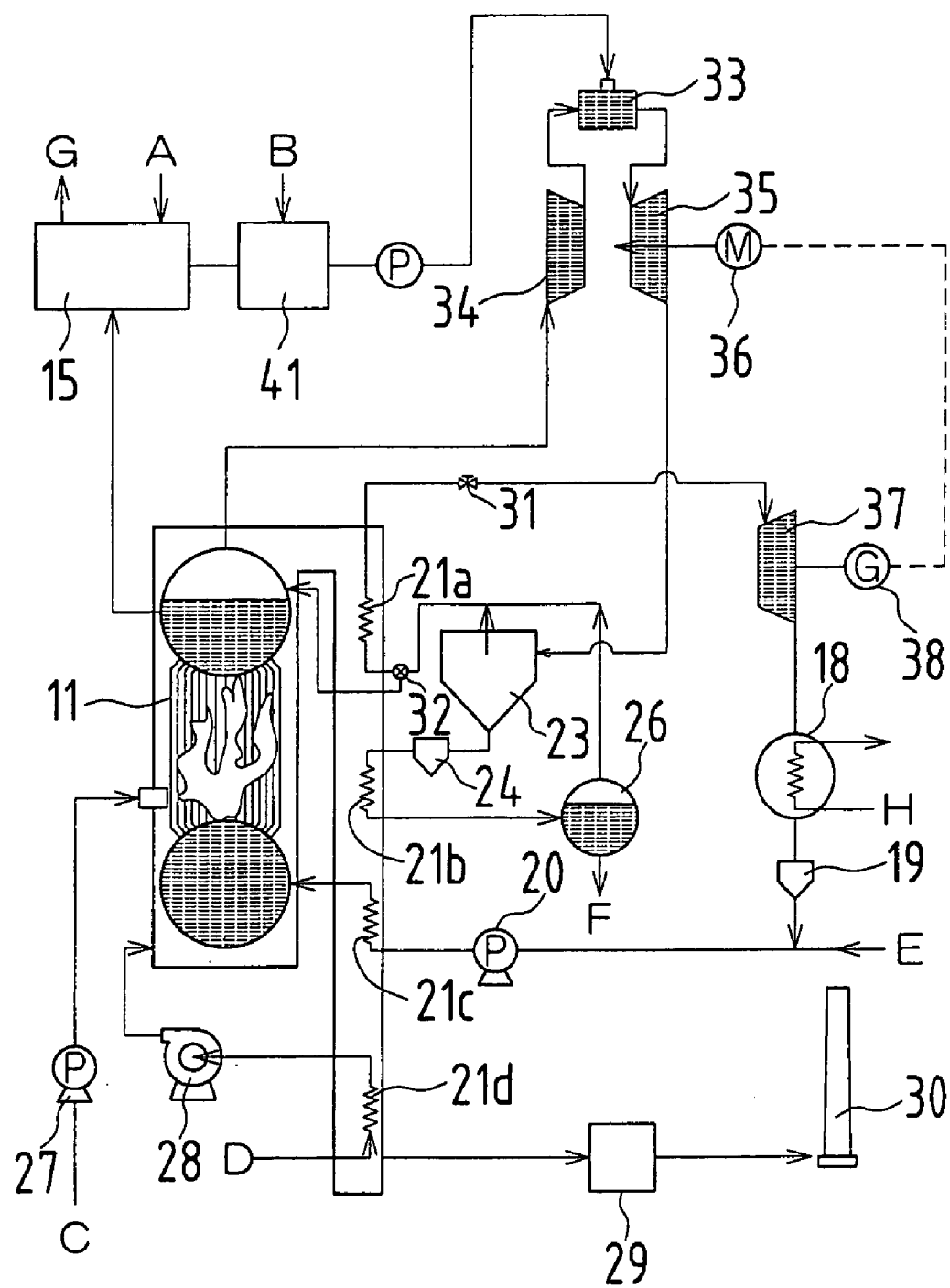
FIG. 4 is a flowchart in a situation where turbo-type compressor-expander(s) are used in a reaction apparatus for organic and/or other substances employing supercritical fluid(s) and/or subcritical fluid(s) in accordance with the present invention.

Next, the reactor shown in FIG. 4 is a turbo-type high-pressure compressor-expander, water vapor from boiler 11 being introduced into centrifugal compressor 34, which represents one type of turbocompressor. At centrifugal compressor 34, water vapor introduced thereinto may be compressed to form supercritical water and/or subcritical water. In addition, this supercritical water and/or subcritical water is delivered to high-pressure reactor 33.

At high-pressure reactor 33, ligneous feedstock A is introduced into ligneous slurry tank 41, and after this is mixed homogeneously with water, the mixture is continuously supplied therefrom by means of a feed pump. This wood meal which serves as reactant substance comes into contact with supercritical water and/or subcritical water delivered to that high-pressure reactor 33 and undergoes hydrolytic reaction(s).

Chemical reaction of this wood meal is such that supercritical water and/or subcritical water may be introduced into radial turbine 35 from high-pressure reactor 33, resulting in expansion and causing the vapor therein to once again become wet vapor, and also causing termination of such reaction(s) due to the decrease in temperature at such time 36 is a motor for driving radial turbine 35.

Such reaction processes require neither high-temperature water nor cooling water; and furthermore, because wood meal reaction time can be varied by changing rotational velocity of radial turbine 35, control thereof is easy. Furthermore, at centrifugal separator 34, while a large amount of work is required, actuation is carried out so as to cause this work to be extracted such that cancellation occurs during expansion by radial turbine 35 which is arranged along a single axis. Vapor which has exited turbine 35 undergoes gas-liquid separation at cyclone separator 23, and while most of the saturated vapor is returned to boiler 11, a portion thereof is guided to radial turbine 37, producing motive force and allowing electrical power to be obtained from electrical generator 38, with this being used to supplement driving of centrifugal compressor 34.

Figure 5:
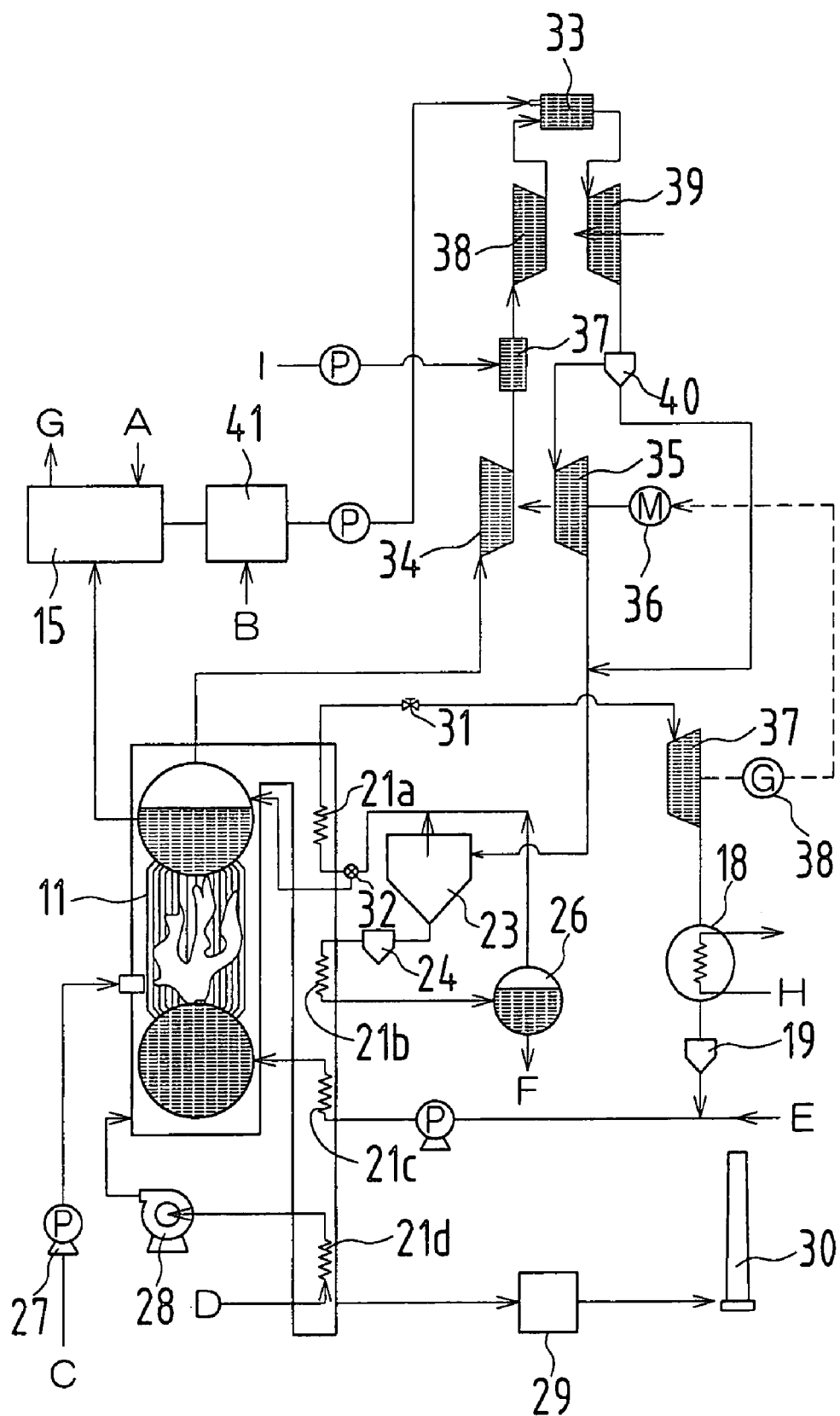
FIG. 5 is a flowchart in a situation where turbo-type compressor-expander(s) are used in a reaction apparatus for organic and/or other substances employing supercritical fluid(s) and/or subcritical fluid(s) in accordance with the present invention.

As shown in FIG. 5, in order to easily obtained high-temperature, high-pressure state(s) of fluid(s), two stages of, or a plurality of stages of, centrifugal compressors 34 and radial turbines 35 may be installed. In such a case, mixer(s) 37 is or are installed between the two stages of centrifugal separators 38, and cold water is supplied by feed pump 41 to carry out adjustment of wetness of heated vapor.

Figure 6:
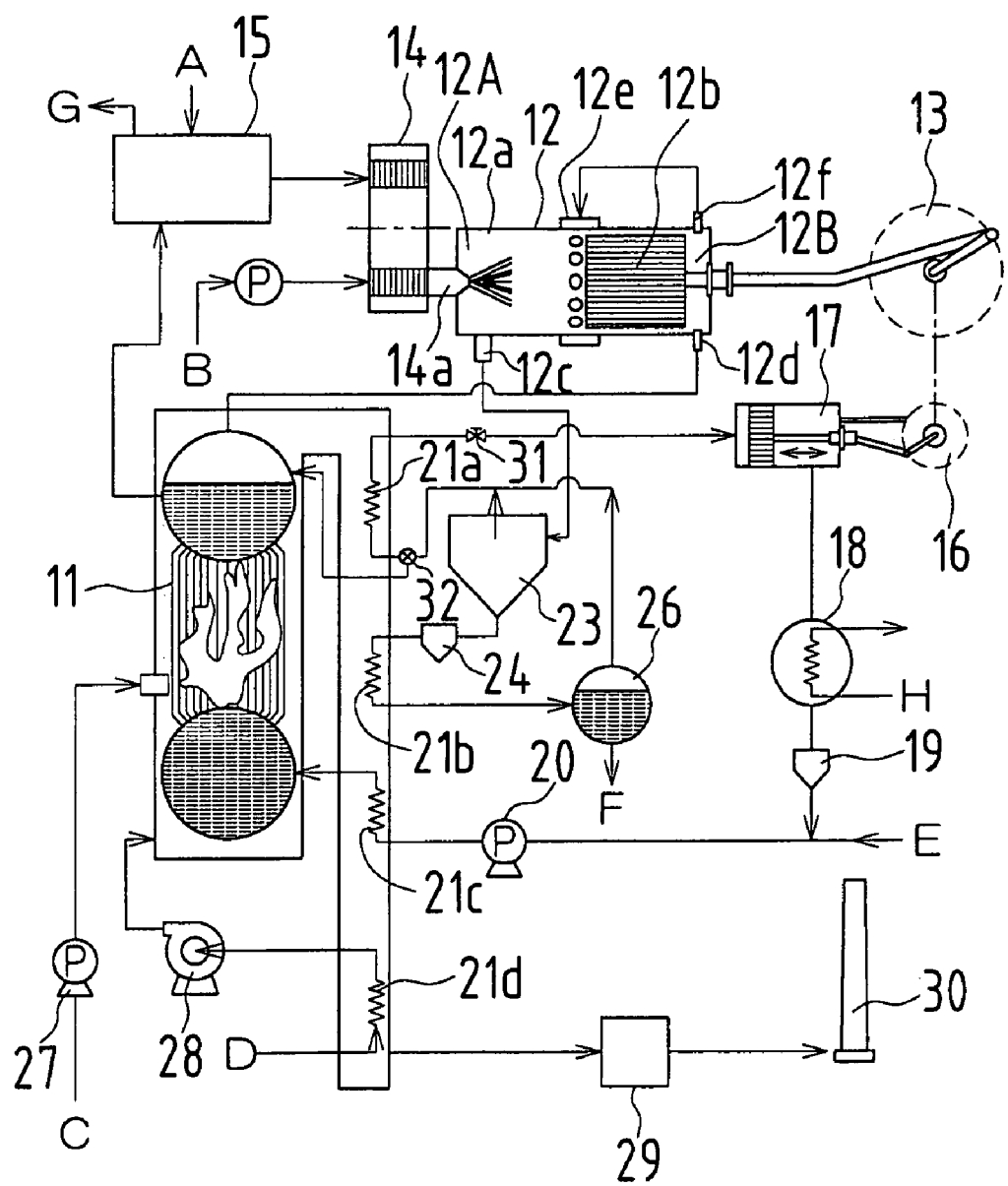
FIG. 6 is a flowchart of another embodiment of a reaction apparatus for organic and/or other substances employing supercritical fluid(s) and/or subcritical fluid(s) in accordance with the present invention.

Next, as shown in FIG. 6, reaction apparatus(es) in accordance with the present invention include constitutions wherein volumes are provided to either side of piston 12*b*, vapor passing through one of the volumes before being introduced into the other of the volumes, and compression of vapor being carried out at only the one thereof. Because such constitution permits reduction in the pressure difference between the volumes to either side thereof, it is possible to reduce the load on the bearing at 13.

Figure 7:
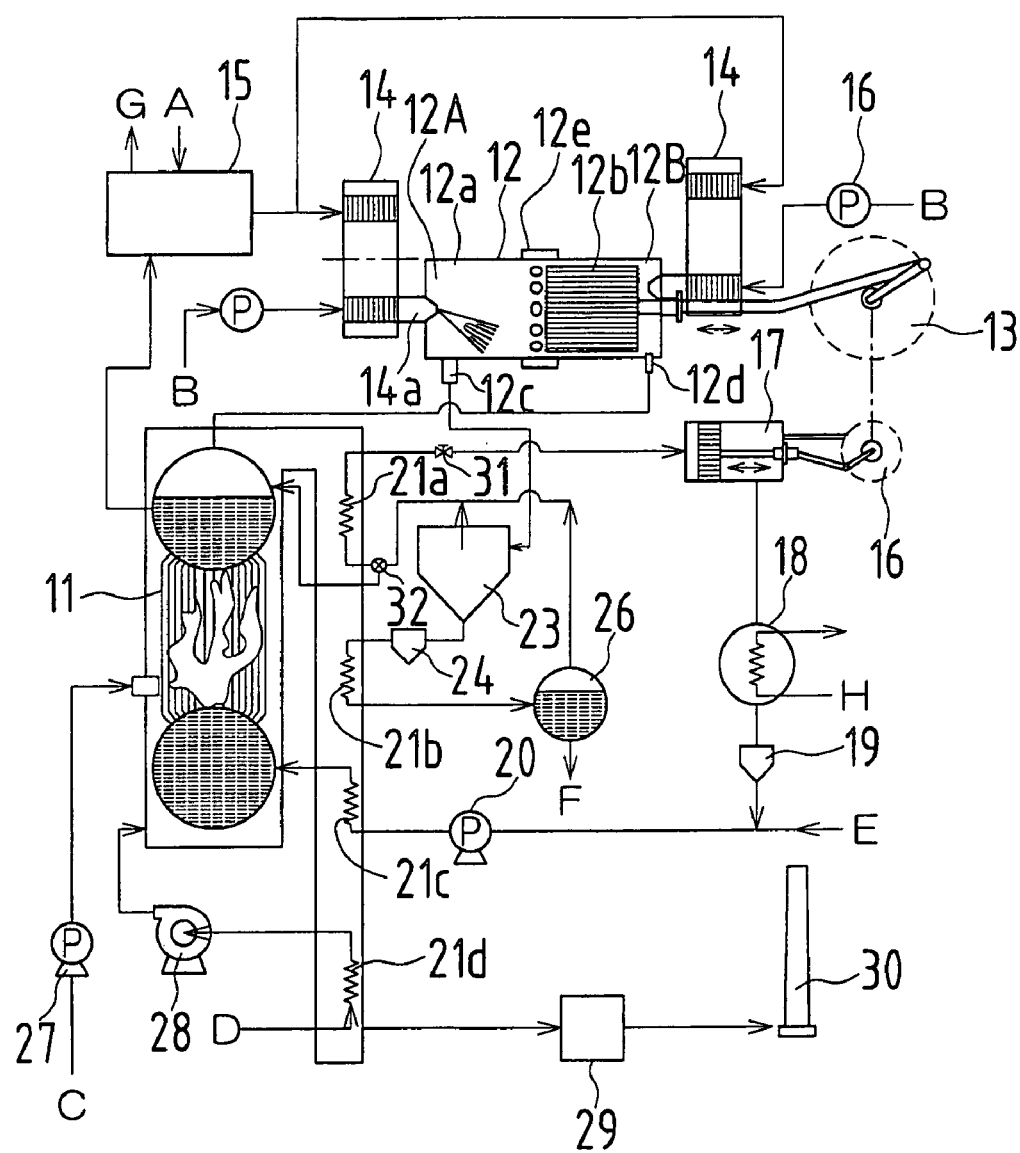
FIG. 7 is a flowchart of another embodiment of a reaction apparatus for organic and/or other substances employing supercritical fluid(s) and/or subcritical fluid(s) in accordance with the present invention.

At the reaction apparatus in accordance with the present invention shown in FIG. 7, reaction apparatus 12 includes a constitution wherein volumes which are formed by cylinder 12*a* and piston 12*b* and at which compression of vapor is carried out are provided to either side of piston 12*b*. Adoption of such a multiple-acting constitution makes it possible to increase the amount of reactant substance(s) undergoing chemical reaction per unit time.

Figure 8:
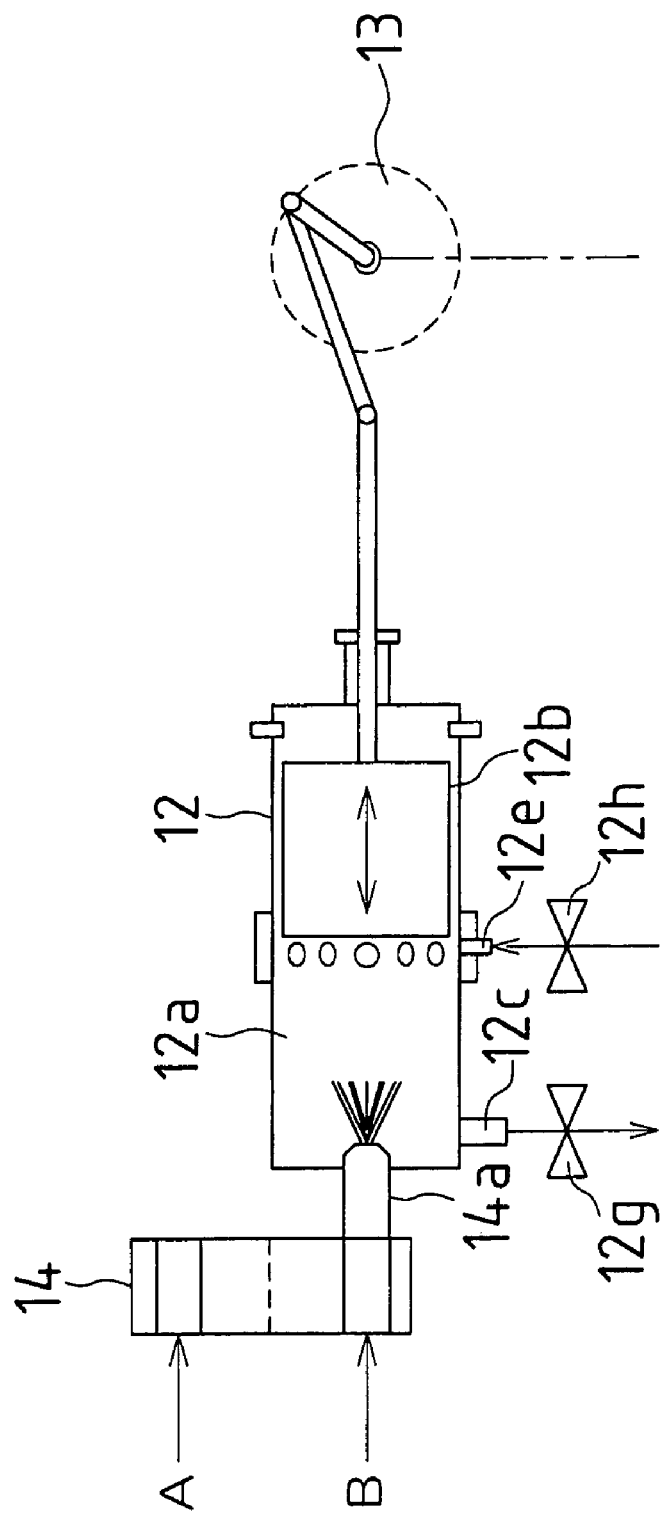
FIG. 8 is a partial flowchart illustrating an embodiment in which a reaction apparatus for organic and/or other substances employing supercritical fluid(s) and/or subcritical fluid(s) in accordance with the present invention is used to cause reactant substance(s) to undergo continuous and repeated treatment.

The reaction apparatus in accordance with the present invention shown in FIG. 8 is constituted such that passage switching valves 12*g*, 12*h* are coupled to scavenging valve 12*c* and introductive port 12*e* in a mechanism at reactor 12 comprising cylinder 12*a* and piston 12*b* belonging to this cylinder 12*a*. Because during a time when both of passage switching valves 12*g*, 12*h* are closed the passages at scavenging valve 12*c* and introductive port 12*e* will be closed off, it is possible to set the apparatus so as to cause reactant substance(s) to undergo treatment by supercritical fluid(s) within this reactor 12 continuously and repeatedly for a fixed period of time.

In this reaction apparatus, when passage switching valves 12*g*, 12*h* are closed, discharge of product from scavenging valve 12*c* is stopped and inflow of new charge(s) of vapor from introductive port 12e is also stopped. This being the case, at reactor 12, supercritical treatment of reactant substance(s) is continuously and repeatedly carried out a plurality of times by piston 12b. This makes it possible to achieve required reaction time in accordance with the type of reactant substance, making it possible to efficiently treat the entirety of the reactant substance even in situations where long times on the order of minutes or the like are required in order for the reaction(s) to be satisfactorily completed.

Figure 9:
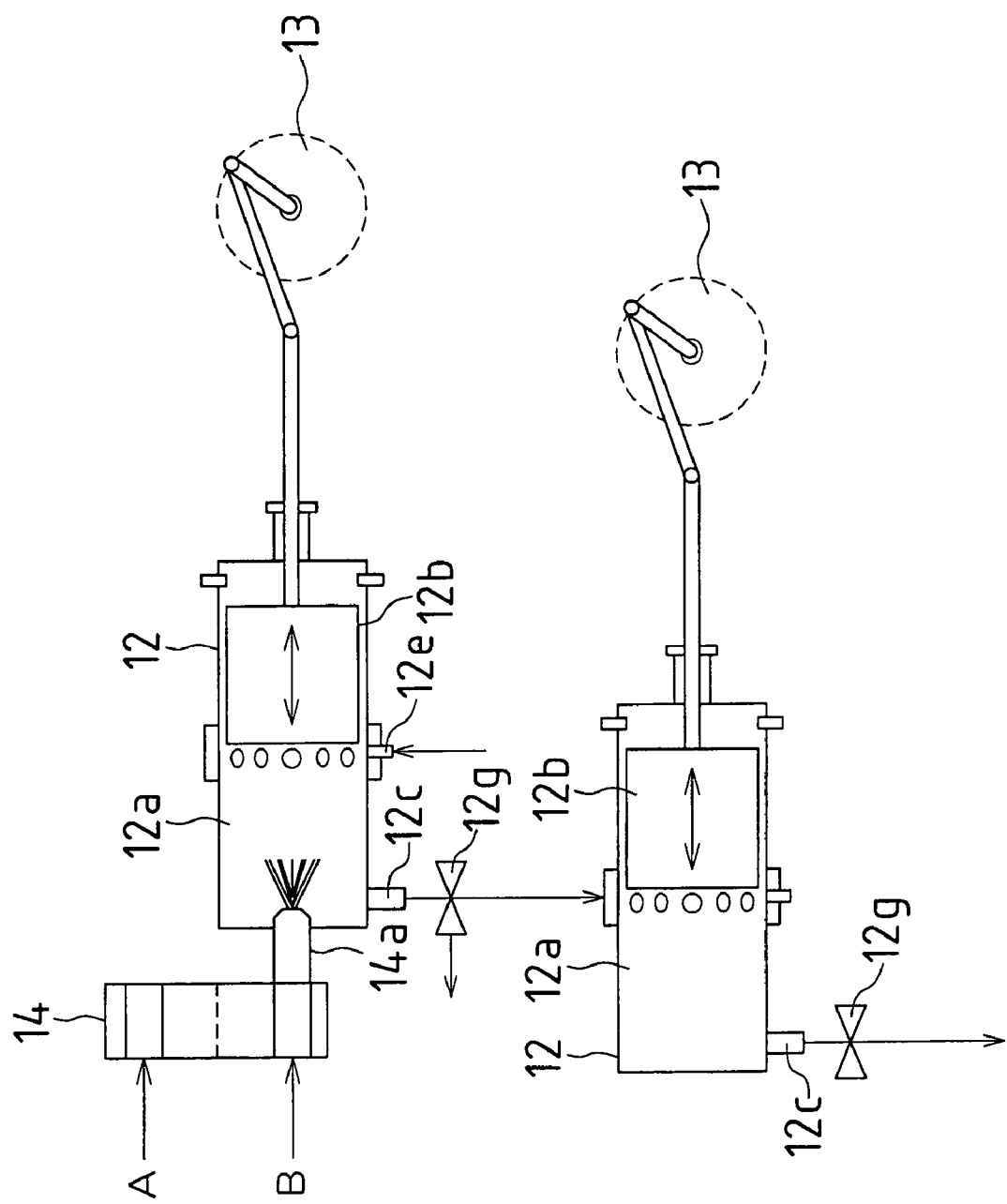
FIG. 9 is a partial flowchart illustrating an embodiment in which, in a reaction apparatus for organic and/or other substances employing supercritical fluid(s) and/or subcritical fluid(s) in accordance with the present invention, a plurality of reactors are provided therein.

As shown in FIG. 9, reaction apparatus(es) in accordance with the present invention include constitutions wherein a plurality of reactors 12 comprising cylinder(s) 12a and piston(s) 12b belonging to such cylinder(s) are provided. With such plural constitution, wood meal reaction products discharged from scavenging valve 12c of first reactor 12 might be sequentially transferred by way of passage switching valve(s) 12g to second reactor 12 and any reactor(s) therebelow. In addition, reaction might again be repeated in like fashion at second reactor 12. As was the case above, in the present case as well it will be possible to achieve required reaction time in accordance with the type of reactant, making it possible to carry out treatment efficiently overall even from the standpoint of time and even in situations where times on the order of minutes are required before reaction(s) can be satisfactorily completed. Such action may be obtained in like fashion in the context of constitutions wherein a plurality of the aforesaid rotary-type reactors 120, and/or centrifugal compressors 34, radial turbines 35, and/or other such turbo-type compressor-expanders and/or reactors are provided.

Figure 10:
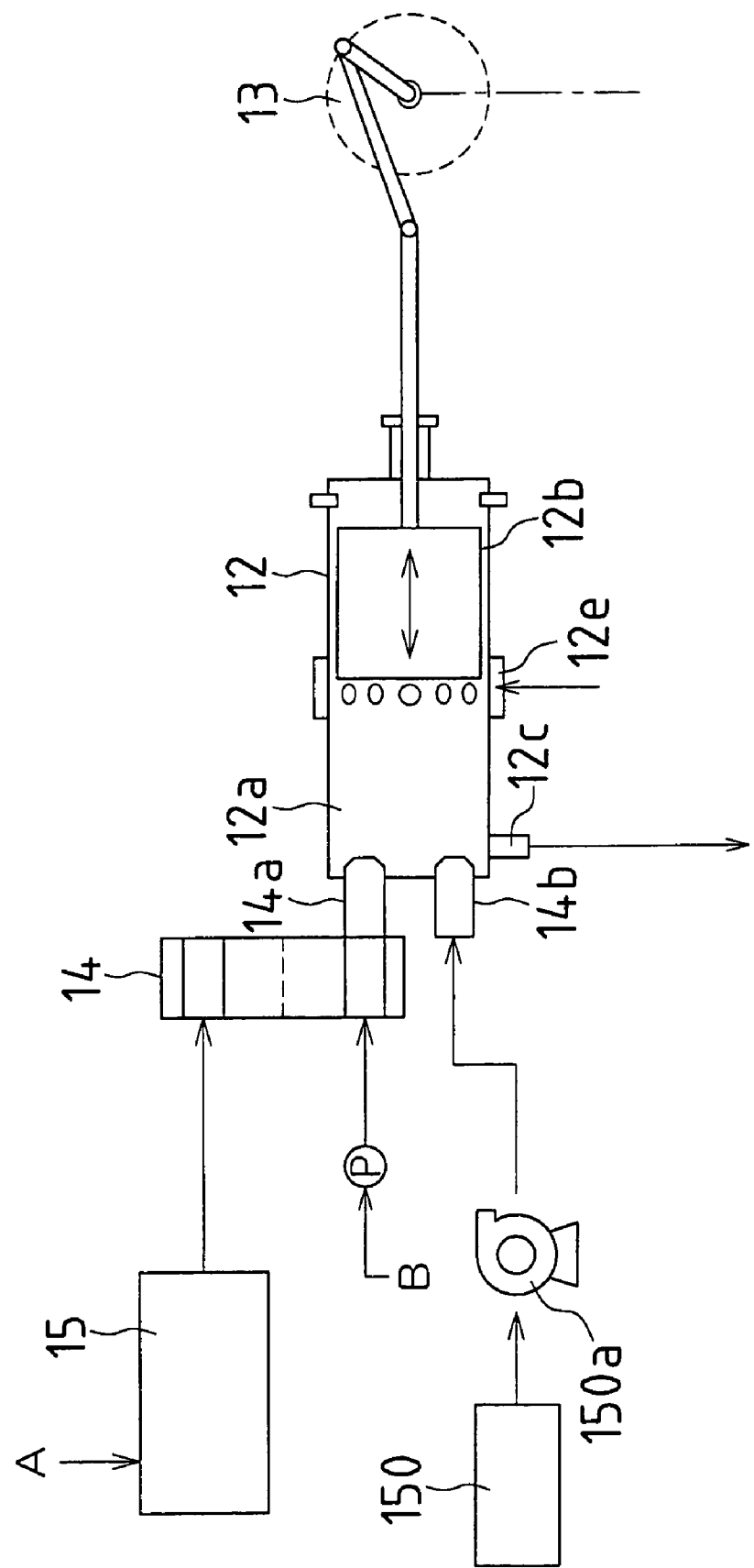
FIG. 10 is a partial flowchart illustrating an embodiment in which oxidant supply apparatus(es) is or are provided at a reaction apparatus for organic and/or other substances employing supercritical fluid(s) and/or subcritical fluid(s) in accordance with the present invention.

At the aforesaid drawings, 29 is an exhaust gas scrubber, exhaust gas produced as a result of the aforesaid chemical reaction(s) and/or exhaust gas produced by boiler 11 being discharged to the atmosphere from chimney 30.

Where the fluid medium is water, apparatus(es) in accordance with the present invention include constitutions, as shown in FIG. 10, provided with oxidant supplier(s) 150 permitting sprayed introduction of oxidant(s) into cylinder chamber(s) 12a. Installation may be such that, from oxidant supplier(s) 150, this is directly coupled to reactor 12 by way of sprayer(s) 150a and injector(s) 14b. This makes it possible for supercritical water oxidation reaction(s) to occur within cylinder 12a, permitting oxidative decomposition of wood meal.

Figure 11:
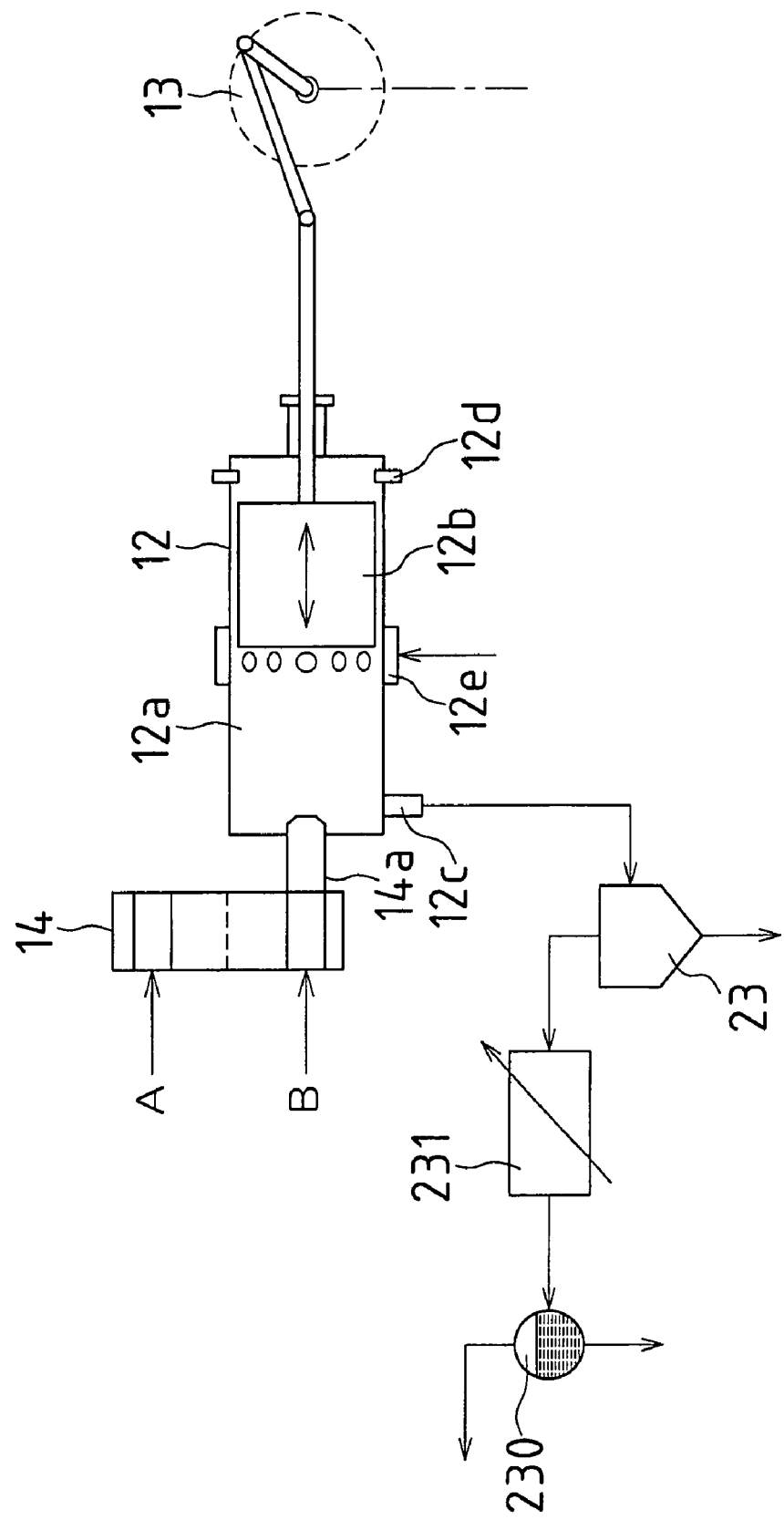
FIG. 11 is a partial flowchart illustrating an embodiment in which gasification treatment apparatus(es) is or are provided at a reaction apparatus for organic and/or other substances employing supercritical fluid(s) and/or subcritical fluid(s) in accordance with the present invention.

That is, adoption of a constitution wherein oxidant supplier(s) 150 is made to spray will make it possible—in accordance with the principles of the supercritical water oxidation method (Supercritical Water Oxidation Method) applicable to supercritical water within high-temperature, high-pressure domains at or above approximately 374° C. and 218 atmospheres—to cause gas, liquid, and/or slurry-like organic substance(s) to form a homogeneous phase with wood meal in supercritical water, causing occurrence of a combustive reaction and permitting complete combustion and decomposition without use of catalyst. This makes it possible for treatment to be carried out with an energy consumption that is lower than is the case during treatment with conventional supercritical water, subcritical water, or pressurized hot water.

Where the fluid medium is water, constitutions may, as shown in FIG. 11, be adopted for reaction apparatus(es) in accordance with the present invention such that they are provided with gasification apparatus(es) comprising gas-liquid separator(s) 230 or the like at location(s) permitting capture of gas component(s) of separated products from cyclone separator 23. Gas component(s) produced therein are obtained by treating wood meal and/or other such organic substance(s) with supercritical water for long period(s) of time and causing occurrence of decomposition reaction(s). At such gasification apparatus(es), substance(s) being treated are such that only the water vapor in gas mixture(s) of water vapor and methane, hydrogen, carbon monoxide, carbon dioxide, and/or other such gas(es) is liquefied by cooling at heat exchanger 231, permitting separation thereof by gas-liquid separator 230, located at a stage subsequent thereto, into water and into methane, hydrogen, carbon monoxide, carbon dioxide, and/or other such gas(es) resulting from decomposition. This is because, at normal pressure, whereas the boiling point of water is 100° C., that of methane is −182° C., that of hydrogen is −253° C., that of carbon monoxide is −191° C., and that of carbon dioxide is −78° C.; which is to say that all of the latter boil at temperatures very much lower than is the case for water. Thermal energy produced during liquefaction of water vapor may be used to heat boiler supply water E at heat exchanger 231. Furthermore, water resulting from separation at gas-liquid separator 230 may be once again returned to the boiler.

Reaction apparatus(es) in accordance with the present invention may employ any of various organic-type substance(s) as reactant substance(s), including—in addition to wood—biomass feedstock(s) including municipal refuse; discarded tire(s), coal and/or other such carbon-containing substance(s); methanol and/or other such low-molecular-weight alcohol(s) and fat(s) and/or oil(s); and also PET bottle(s) and/or other such high-molecular-weight polymer(s); PCB(s), R-series refrigerant(s), DXN(s) (dioxin(s)), and/or other such halogen-containing substance(s); and so forth.

Where the fluid medium is water, alcohol(s), and/or other such protic fluid(s), and where reactant substance is biomass feedstock(s) including municipal refuse, biomass(es) may be hydrolyzed with supercritical water and/or subcritical water to obtain glucose and/or other such low-molecular-weight sugar(s) and/or the like as product(s).

Figure 12:
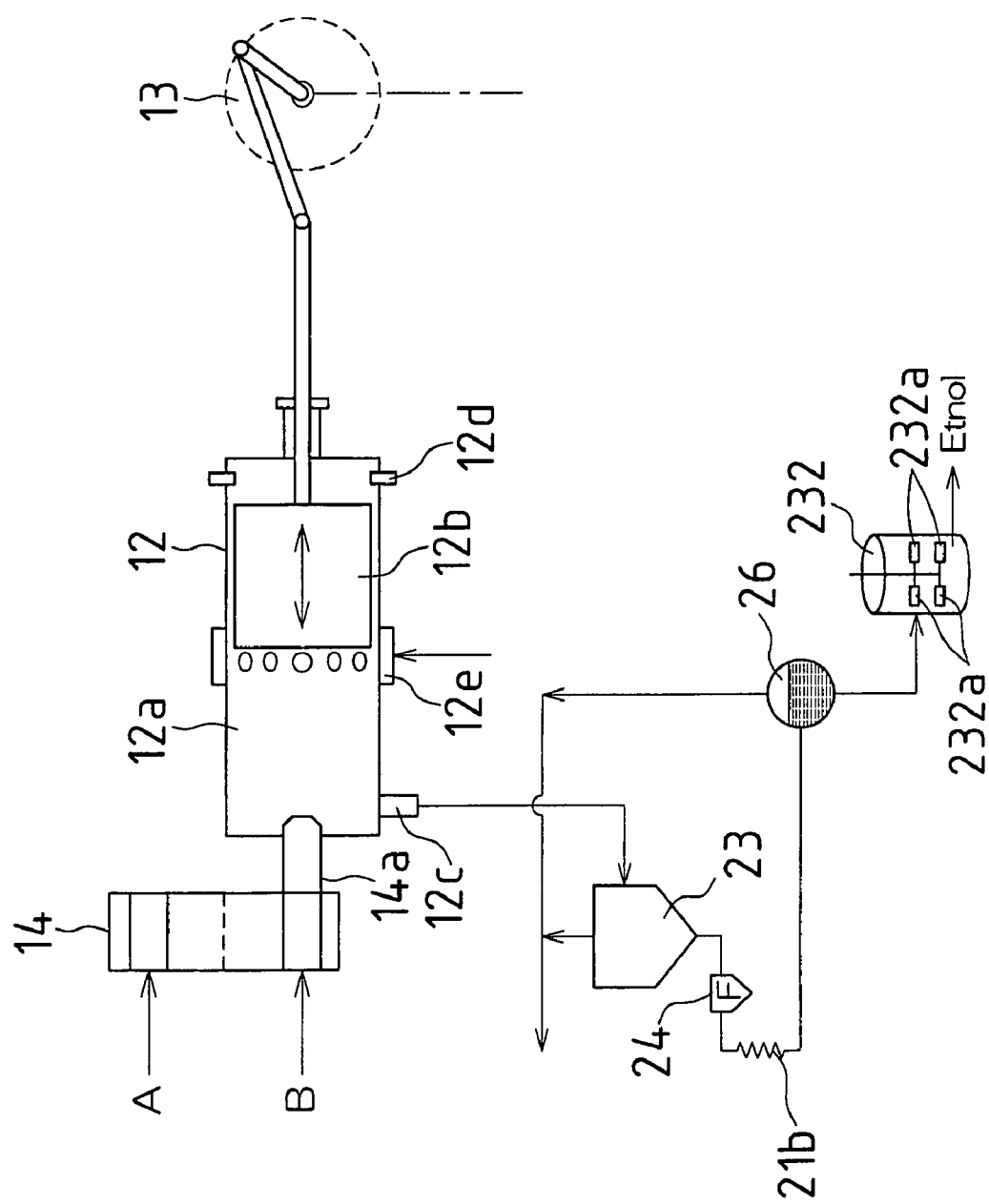
FIG. 12 is a partial flowchart illustrating an embodiment in which ethanol fermentation apparatus(es) is or are provided at a reaction apparatus for organic and/or other substances employing supercritical fluid(s) and/or subcritical fluid(s) in accordance with the present invention.
Figure 13:
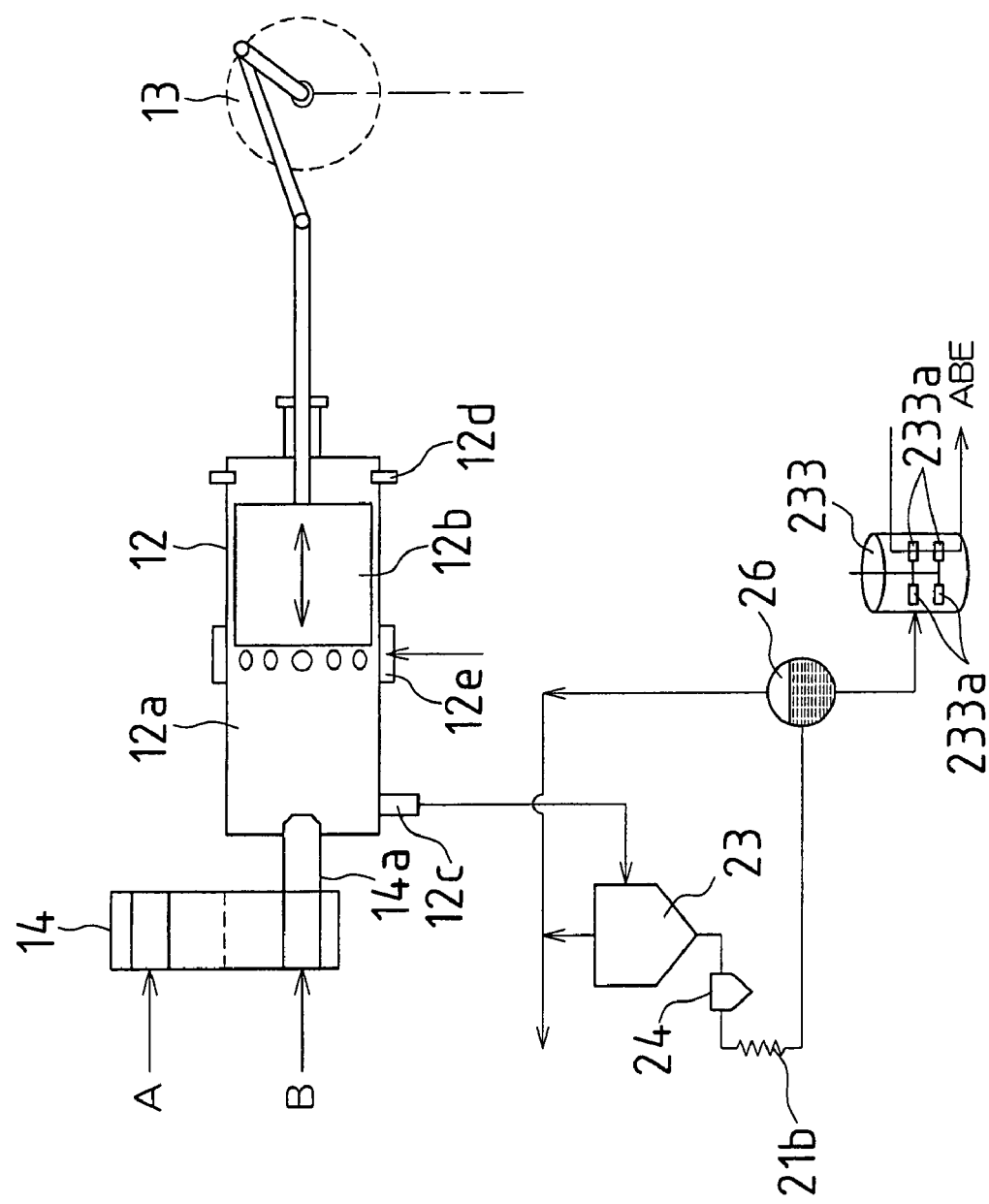
FIG. 13 is a partial flowchart illustrating an embodiment in which ABE fermentation apparatus(es) is or are provided at a reaction apparatus for organic and/or other substances employing supercritical fluid(s) and/or subcritical fluid(s) in accordance with the present invention.
Figure 14:
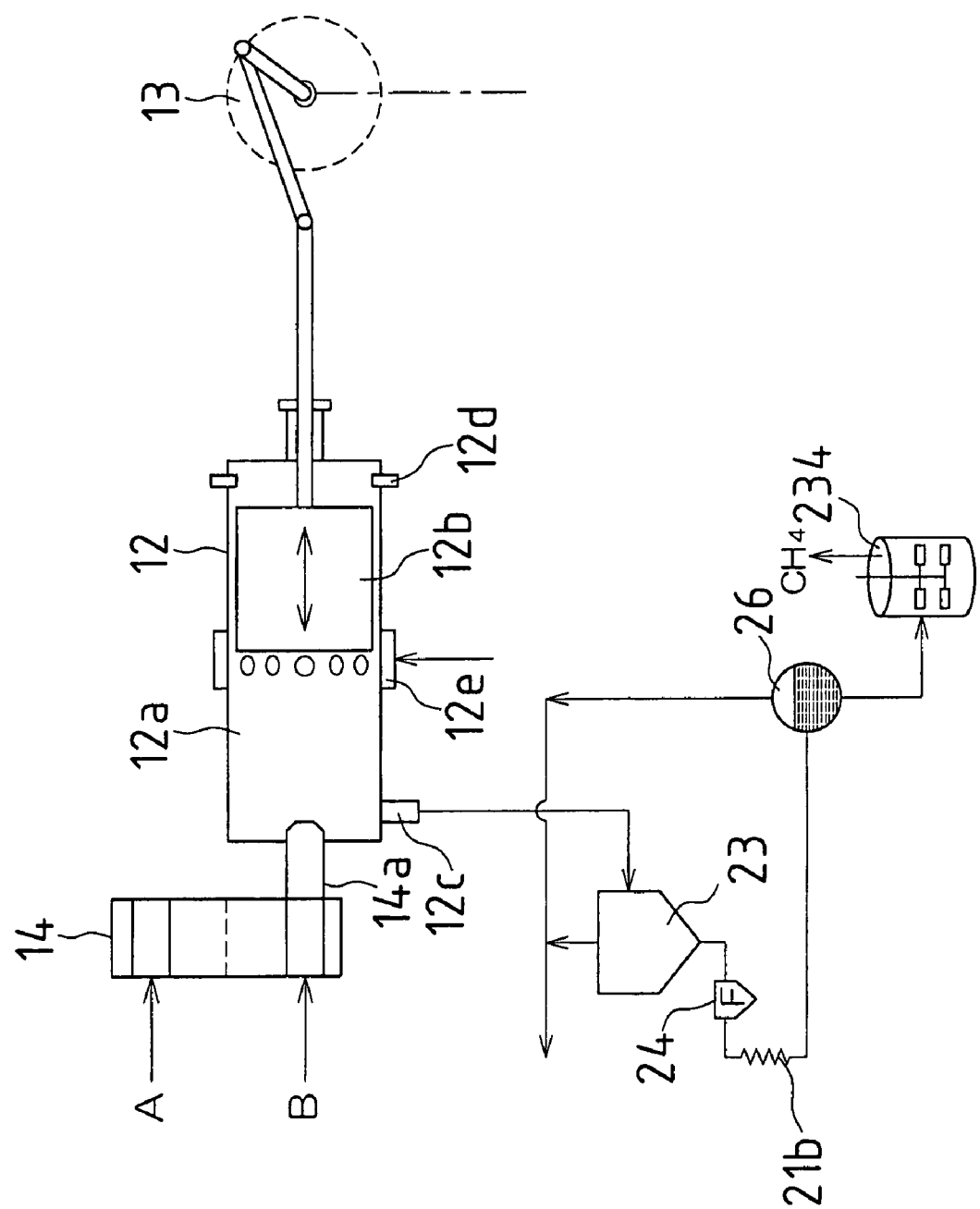
FIG. 14 is a partial flowchart illustrating an embodiment in which methane gas fermentation apparatus(es) is or are provided at a reaction apparatus for organic and/or other substances employing supercritical fluid(s) and/or subcritical fluid(s) in accordance with the present invention.

Furthermore, where reactant(s) is or are any substance(s) selected from among biomass feedstock(s) including municipal refuse, discarded tire(s), coal and/or other such carbon-containing substance(s), such selected substance(s) may be decomposed with supercritical water and/or subcritical water to obtain synthesized gas(es) including methane gas, hydrogen, carbon dioxide, and carbon monoxide. At such time, if temperature of supercritical water is made extremely high, thermal decomposition will proceed rapidly, producing the aforesaid synthesized gas component(s) and causing same to be dissolved in water which is in supercritical state. By returning this to low temperature, because same become synthesized gas(es) and become flammable gas(es), this may also be used as methanol feedstock.

Where reactant substance(s) is or are waste cooking oil(s) and/or other such fat(s) and/or oil(s), these may be made to undergo transesterification reaction(s) using supercritical alcohol(s) and/or subcritical alcohol(s), making it possible to obtain ester compound(s).

Where the fluid medium is water, alcohol(s), and/or other such protic fluid(s), and when reactant substance(s) is or are PET bottle(s) and/or other such polyester(s), these may be decomposed to terephthalic acid, ethylene glycol, and/or other such chemical precursor(s), which may then be recovered.

Where reactant(s) is or are PCB(s), R-series refrigerant(s), DXN(s) (dioxin(s)), and/or other such decomposition-resistant halogen-containing substance(s), [these] may be decomposed until rendered harmless. In such case, decomposition is sometimes carried out with addition of oxygen and/or other such oxidant(s) and/or alkali and/or the like.

Where the fluid medium is water, alcohol(s), and/or other such protic fluid(s), reaction apparatus(es) in accordance with the present invention may, as shown in FIG. 12, when product(s) obtained by decomposition of biomass(es) is or are glucose and/or other such low-molecular-weight sugar(s) such as was described above, be such that provision of ethanol fermentor(s) 232 at location(s) behind gas-liquid separator 26 makes it possible, due to supercritical water and/or subcritical water therein, to cause glucose and/or other such low-molecular-weight molecule(s) obtained by saccharification of high-molecular-weight molecule(s) to be efficiently converted into ethanol. That is, water-soluble component(s) of product(s) at gas-liquid separator 26 are introduced into ethanol fermentor 232, and ethanol is produced as a result of action of yeast(s), colon bacillus or bacilli, and/or other such microorganism(s). Accordingly, in such a case, it is possible to obtain ethanol more efficiently and with less consumption of energy than would be the case with conventional treatment apparatuses employing supercritical water, subcritical water, hot water, or the like. Furthermore, where water and/or other such protic fluid(s) in supercritical and/or subcritical state(s) is or are used to carry out saccharification treatment, in contrast to times on the order of seconds or less for supercritical water and times on the order of anywhere from several minutes to several seconds for subcritical water, because the time required for carrying out such treatment would be several tens of hours with enzymatic saccharification, extremely long treatment times being required, the method of using supercritical water and/or subcritical water to carry out saccharification makes it possible for treatment to be carried out in extremely brief period(s) of time.

Where the fluid medium is water, alcohol(s), and/or other such protic fluid(s), as shown in FIG. 13, a constitution may be adopted wherein, instead of the aforesaid ethanol fermentor(s) 232, ABA fermentor(s) 233 is or are provided at location(s) permitting introduction thereinto of water-soluble component(s) of product(s) obtained. At ABA fermentor 233, product(s) introduced thereinto may be converted as far as acetone, butanol, and ethanol. This permits ABA fermentation to be carried out. Reaction apparatus(es) in accordance with the present invention make it possible to obtain acetone, butanol, and/or ethanol more efficiently and with less consumption of energy than would be the case with conventional treatment apparatuses employing supercritical water, subcritical water, hot water, or the like.

Where the fluid medium is water, alcohol(s), and/or other such protic fluid(s), reaction apparatus(es) in accordance with the present invention may, as shown in FIG. 14, be such that provision of methane fermentor(s) 234 at location(s) behind gas-liquid separator 26 makes it possible, due to supercritical water and/or subcritical water therein, to cause glucose and/or other such low-molecular-weight molecule(s) obtainable by breaking down high-molecular-weight molecule(s) into lower-molecular-weight molecule(s) to be efficiently converted into methane gas. That is, product(s) broken down into lower-molecular-weight molecule(s) by supercritical and/or subcritical fluid(s) is made to undergo conversion as far as methane gas due to action of methane fermentation microorganism(s) within methane fermentor 234. In such a case, it is possible to obtain methane gas more efficiently and with less consumption of energy than would be the case with conventional treatment apparatuses employing supercritical water, subcritical water, hot water, or the like; and in addition, it is moreover possible to carry out treatment and obtain methane gas in much shorter time(s) and much more rapidly than would be the case with methods not employing supercritical water and/or subcritical water.

Next, a first working example of reaction apparatus 10 for organic and/or other substance(s) employing supercritical fluid(s) which is associated with the present invention will be described. This reaction apparatus 10 uses water as fluid.

At compressor-expander 12, where water vapor is to be compressed to obtain supercritical water, and reaction of reactant substance(s) with supercritical water is to be carried out, pressure at the conclusion of compression must be greater than or equal to the critical pressure of 22.1 MPa and temperature at such time must be greater than or equal to the critical temperature of 374° C. Where reactant substance is wood meal and this is to be hydrolyzed to obtain glucose and/or other such low-molecular-weight sugar(s), it is known that the higher the pressure at the conclusion of compression the more it will be possible to suppress overdecomposition of product component(s), and furthermore, that the higher the temperature at such time the greater will be the reaction rate.

With such facts in mind, 25 MPa and 410° C. were therefore respectively selected as pressure and temperature to be reached by water vapor as a result of compression. Here, assuming, based upon consideration of the limit where the amount of wood meal is made small relative to the amount of water, that the effect thereof can be ignored, and moreover assuming that there is no thermal transfer between water vapor and cylinder during compression and so forth, the foregoing target point being reached due to the change in entropy, the state of the wet vapor which would need to exist at the time that compression is initiated was determined mathematically. Thermodynamic data for water and vapor is based on Japan Society of Mechanical Engineers Steam Tables (1980).

Specific entropy s at the target point was first determined, permitting determination of dryness x such as would cause specific entropy to be equal to the target specific entropy based on the difference (s"−s') between specific entropy s" of saturated vapor and specific entropy s' of saturated water at the pressure assumed to exist prior to compression. The table in FIG. 18 shows results calculated for a situation where the pressure of the wet vapor prior to compression is 3 MPa and for the state existing at the target point.

As is clear from the results shown in this FIG. 18, saturation temperature of wet vapor at 3 MPa is 234° C., and a dryness x of 75.2% is needed to obtain a specific entropy equal to the specific entropy at the target point. Once dryness x has been determined, it is possible to determine specific volume v and density 1/v of wet vapor based on the difference (v"−v') between specific volume v" of saturated vapor and specific volume v' of saturated water. Compression ratio $\epsilon$, defined as the ratio between specific volume v prior to compression and specific volume $v_0$ at the target point, can also be determined.

Based on FIG. 18, compression ratio $\epsilon$ being 7.3, if the volume within the cylinder prior to compression is compressed to 1/7.3 thereof it will be possible to achieve the target supercritical water state. If it can be assumed that the effects of reaction are small enough to be ignored and that changes are isoentropic, then, after reaching the target point, expansion will proceed by virtue of the crank mechanism, volume within the cylinder reaching a maximum, and following expansion the same state will be assumed as existed prior to compression. Note that with a water vapor pressure of 3 MPa prior to compression, this can also be used for explosive disintegration of that saturated water in order to facilitate reaction of wood meal feedstock. Furthermore, if the pressure prior to compression is very much greater than 3 MPa, then there is a possibility that it will no longer be possible to completely stop the reaction due to the fact that saturation temperature is high.

Next, assuming that only saturated vapor is delivered to the interior of the cylinder prior to initiation of compression and that wood meal serving as reactant substance is sprayed together with cold water, the amount of cold water necessary to achieve a satisfactory and homogeneous distribution of wood meal within the cylinder and to at the same time suppress unwanted progress of reaction(s) during compression was determined using the same conditions as above. To achieve the same target-point supercritical water state as for wet vapor with homogeneous mixture of wood meal at the end of compression, it is sufficient to make the specific enthalpy prior to compression the same value as that for wet vapor. Taking specific enthalpy of cold water to be $h_w'$, specific enthalpy of wet vapor prior to compression to be $h_s'$, specific enthalpy of saturated vapor at such time to be $h_s''$, and mass of cold water corresponding to total mass of water and water vapor to be y, the following relationship can be derived from such fact(s).

$$y=(h_s''-h_s')/(h_s''-h_w')$$

Where temperature of cold water is 50° C. and pressure of vapor prior to compression is 3 MPa, the required value can be determined to be y=0.183 based on the foregoing Japan Society of Mechanical Engineers Steam Tables (1980). That is, the amount of cold water injected therein should be 18% of the total amount of water, and the balance should be injected into the cylinder in a saturated-vapor state.

While the change in state will in practice differ from the foregoing ideal scenario due to the influence of various factors including amount of reactant substance, reaction, thermal transfer between water vapor and walls, and so forth, the amount of this difference is not all that large, and even where discrepancy or discrepancies exist it will be sufficient to add appropriate correction(s) to design conditions.

Figure 15:
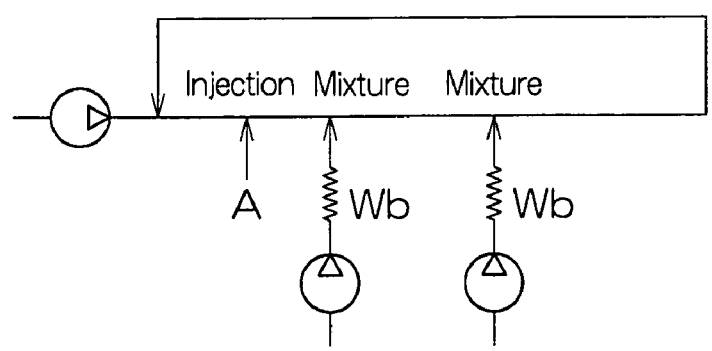
FIG. 15 is a drawing illustrating work cycles in a flow-type supercritical-fluid and/or subcritical-fluid reaction apparatus presented as a comparative example.

Next, the energy budget applicable to reaction apparatus 10 will be described in comparison with a flow-type supercritical water reaction apparatus representing a conventional reaction apparatus. As shown in FIG. 15, at a flow-type supercritical water reaction apparatus, which represents a conventional reaction apparatus, cold water A in which a large amount of feedstock wood meal is dispersed is mixed with supercritical water $W_b$ which is at a temperature higher than target temperature (e.g., 410° C.), causing the target supercritical water state to be attained, and rapid cooling of supercritical water with cooling water $W_c$ causes reaction of wood meal to be terminated.

Below, the energy budget for the conventional flow-type supercritical water reaction apparatus at 25 MPa and 410° C., this having been chosen as the target point, is calculated. Specific enthalpy $h_{150}$ at 150° C. is $h_{150}$=647.7 kJ/kg, and at 410° C. this is $h_{140}$=2691 kJ/kg. In addition, at 550° C., $h_{550}$=3337 kJ/kg. Calculation indicates that, given a situation where cooling water at 150° C. is circulating, the target-point supercritical state will be achieved if 550° C. supercritical water is made to flow thereinto and mix therewith in an amount which is approximately 3.165 times the amount of the cold water (calculated from the specific enthalpy formula $h_{410}$ (1+a)=$h_{150}$+$h_{150}$a, where the amount of supercritical water at 550° C. mixed therewith per 1 kg of cold water at 150° C. is akg). Design conditions were such that the supercritical water is thereafter cooled to 150° C. with cold water, stopping the reaction.

Figure 16:
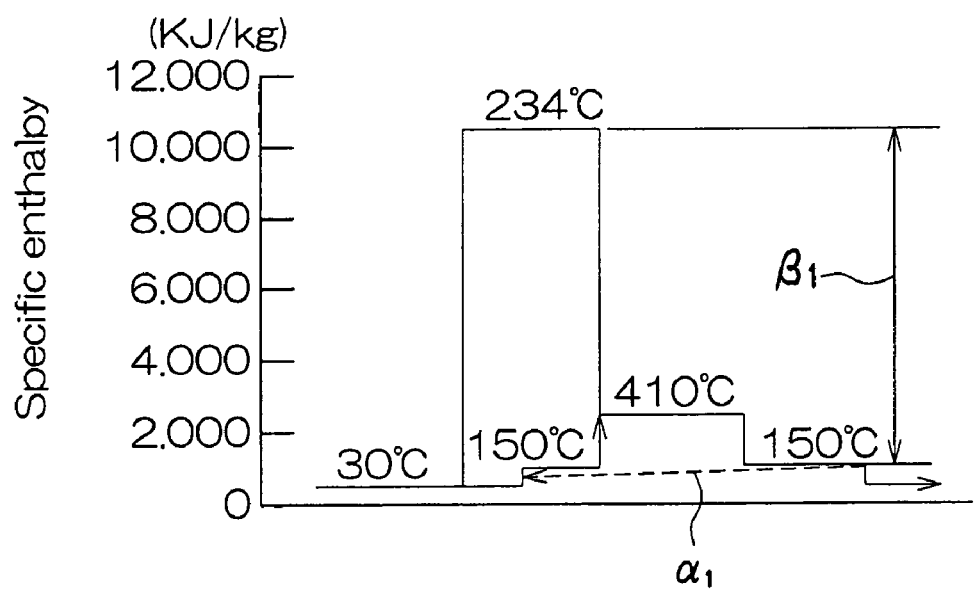
FIG. 16 is a drawing showing specific enthalpy during processes occurring at a flow-type supercritical-fluid and/or subcritical-fluid reaction apparatus presented as a comparative example.

As described above, in the conventional apparatus, the fact that the reaction is terminated through addition of cold water means that an amount of supercritical water at 550° C. which is 3.15 times the amount of cold water, or $h_{505}$×3.165=10560 kJ/kg worth of energy, must be discarded. Note however that a portion thereof may be used to heat cold water at normal temperature to 150° C. Accordingly, as shown in FIG. 16, in a conventional flow-type supercritical water reaction apparatus, the energy loss component $\beta_1$ is 9910 kJ/kg, this being 10560 kJ/kg less $h_{150}$, or the 648 kJ/kg component.

Figure 17:
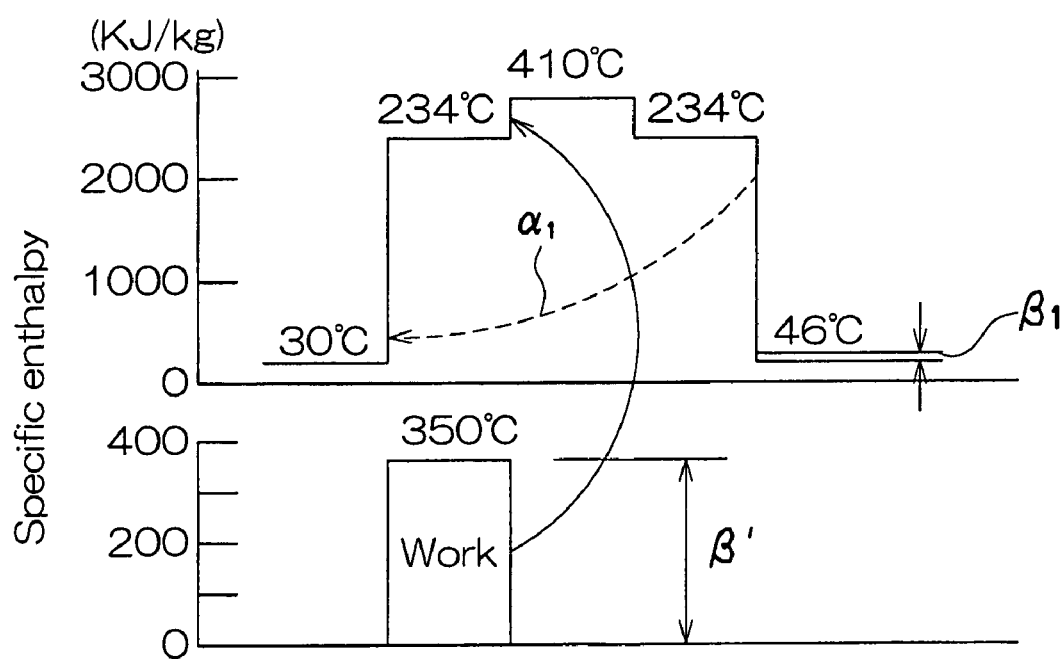
FIG. 17 is a drawing showing specific enthalpy during processes occurring at a reaction apparatus for organic and/or other substances employing supercritical fluid(s) and/or subcritical fluid(s) associated with the present invention.

On the other hand, the energy budget for reaction apparatus 10 of the present invention at 25 MPa and 410° C., this having been chosen as the target point, is calculated such that cold water at normal temperature is heated to 3 MPa and 234° C., and this wet vapor is compressed by means of a reactive expander to achieve the target point (25 MPa and 410° C.). Design conditions were such that the supercritical water is thereafter cooled by expansion to again become 234° C. Specific enthalpy of wet vapor of dryness 0.752 at 3 MPa and 234° C. is 2357 kJ/kg, and at 410° C. this is $h_{410}$=2691 kJ/kg. From FIG. 17, it can be seen that, of the specific enthalpy of the wet vapor (2691 kJ/kg), almost all the energy represented thereby is recovered, the small irreversible energy loss component(s) being attributable to irreversible changes accompanying chemical reaction of wood meal; i.e., thermal transfer between cylinder wall(s) and liquid within cylinder(s); friction of piston(s), crank mechanism(s); and other such minor portions thereof, and so forth.

The work of compression performed by the reactor, based on the specific internal energy u and the relationship u=h−pv (h=specific enthalpy; p=pressure; v=specific volume), is 313 kJ/kg (thermodynamic data for water and vapor is based on Japan Society of Mechanical Engineers Steam Tables (1980)). While almost all of the work of compression is recovered during expansion; reaction, thermal losses, friction and the like manifest themselves as irreversible loss components, such loss components being captured by the motive force generator. If the total lost work at the reactor and the motive force generator is taken to be 28%, such irreversible mechanical loss components would represent approximately 122 kJ/kg. Based on the fact that these loss components are captured by the motive force generator, if the theoretical thermal efficiency of the motive force generator is taken to be 33%, approximately 370 kJ/kg worth of heat would be required at the motive force generator. Accordingly, the energy loss component $\beta'$ at the reactor and the motive force generator is 370 kJ/kg, which is not more than 1/27 of the 9910 kJ/kg at the conventional flow-type reaction apparatus. Furthermore, while reaction apparatus 10 bears the load of the explosive disintegrator, because the energy associated with the explosive disintegrator is the same for both reaction apparatus 10 and the conventional flow-type reaction apparatus, it has been omitted from energy budget calculations.

As described above, energy loss components are very much smaller and the amount of energy consumed during operation is very much less with reaction apparatus 10 than is the case with the conventional flow-type reaction apparatus.

Where a fluid other than water is used at the reaction apparatus of the present invention, it will still be possible to cause this to assume a supercritical state. Examples of such fluids are carbon dioxide, nitrous oxide, Freon 12, Freon 13, ethane, ethylene, propane, propylene, butane, hexane, methanol, ethanol, benzene, toluene, ammonia, and so forth. Data indicating critical conditions for these substances is indicated at FIG. 19.

The present apparatus permits attainment of supercritical state(s) with water, for which critical temperature and pressure are high. Based on the data indicating critical conditions at FIG. 19, because conditions of critical temperature and critical pressure for Freon 12 are lower than is the case for water, in the event that Freon 12 is used as fluid medium it will be more than possible to achieve supercritical states in the context of the apparatus of the present invention.

As a second embodiment of the present invention, where Freon 12 was used as fluid s medium, taking temperature to be 130° C. and pressure to be 4.9 MPa at the target-point state for Freon 12, calculation was carried out for a situation where the pressure of wet vapor prior to compression is 0.7 MPa, the results being shown in the table at FIG. 20. Thermodynamic data for Freon 12 is based on Japanese Association of Refrigeration R12 Refrigerant Table of Thermal Property Values (1981).

Based on FIG. 20, as was done above where the fluid was water, compression pressure ϵ having been determined to be 6.4, if the volume within the cylinder is compressed to 6.4/1 of what it was prior to compression it will be possible to achieve the target supercritical fluid state. Moreover, after reaching the target point, expansion proceeds by virtue of the crank mechanism, volume within the cylinder reaching a maximum, and following expansion the same state is assumed as existed prior to compression.

At reaction apparatus 10 of the present invention, the energy budget at 4.9 MPa and 130° C., this having been chosen as the target point, is such that Freon 12 at normal temperature is heated to 0.7 MPa and 40.0° C., and this wet vapor is compressed by means of a reactor to achieve the aforesaid target point, design conditions being such that the supercritical fluid is thereafter cooled by expansion to again become 40.0° C. In the present case as well, of the specific enthalpy of the wet vapor, almost all the energy represented thereby is recovered, the small irreversible energy loss component(s) being attributable to irreversible changes accompanying chemical reaction; i.e., thermal transfer between cylinder wall(s) and liquid within cylinder(s); friction of piston(s), crank mechanism(s); and other such minor portions thereof, and so forth. Thus, while the work of compression is recovered during expansion; reaction, thermal losses, friction and the like manifest themselves as irreversible loss components, such loss components being captured by the motive force generator.

Even where the fluid is Freon 12, because energy loss components at the reactor and the motive force generator in the apparatus of the present invention are very much smaller than values therefor in a conventional flow-type reaction apparatus, the amount of energy required to operate the apparatus of the present invention is extremely small.

POTENTIAL FOR USE IN INDUSTRY

Because reaction apparatus(es) for organic and/or other substances employing supercritical fluid and/or subcritical fluid in accordance with the present invention are constituted as described above, benefits such as the following are delivered thereby.

Because reaction apparatus(es) for organic and/or other substance(s) employing supercritical water and/or subcritical water in accordance with the present invention comprise—by virtue of piston(s), rotary, and/or turbocompressor(s) and turbine(s)—means for compressing vapor(s) and obtaining supercritical fluid(s) and/or subcritical fluid(s), means for bringing such supercritical fluid(s) and/or subcritical fluid(s) into contact with organic substance(s) and/or other reactant substance(s) and causing occurrence of chemical reaction(s), and means for causing expansion and decompression of fluid(s) including product(s) produced as a result of such chemical reaction(s), as well as means for spraying reactant substance(s) together with liquid-like fluid(s) into reactor(s), it is possible to cool and rapidly stop (freeze) reaction(s) of reactant substance(s) occurring at rapid rate(s) in high-temperature, high-pressure fluid(s) without use of low-temperature liquid(s) (cold water in the case where the fluid is water).

By adjusting speed(s) of vertical motion of piston(s) and/or rotary motion of rotor(s), and/or by adjusting volume(s) of reaction vessel(s) connected to turbine(s) and turbocompressor(s), it is possible to control reaction(s) with a "resolution" which is such that reaction(s) occurring at rapid rate(s) in supercritical fluid(s), subcritical fluid(s), and/or other such high-temperature, high-pressure fluid(s) are divided into extremely brief period(s) of time.

These means are such that work performed by expansion during lowering of temperature(s) and pressure(s) as a result of expansion of supercritical and/or subcritical high-temperature, high-pressure fluid(s) to stop reaction(s) is again utilized as work for compression of vapor(s), permitting recovery of energy necessary for generation of supercritical and/or subcritical high-temperature, high-pressure fluid(s). By making use of this recovered energy, it is possible to provide an apparatus wherein energy in chemical reaction(s) occurring in supercritical and/or subcritical high-temperature, high-pressure fluid(s) is extremely high.

By adopting constitutions wherein passage switching valve(s) and/or other such open-/close-type member(s) are respectively provided at passage(s) of introductive port(s) and scavenging valves(s) in reaction mechanism(s) of reciprocating-type and/or rotary-type reactor(s) and wherein treatment of reactant substance(s) can can be carried out continuously and repeatedly for fixed period(s) of time when such open-/close-type member(s) are closed, or constitutions wherein a plurality of reciprocating-type and/or rotary-type reactors are provided, it is possible to achieve effective treatment time(s) even for substance(s) to be treated requiring treatment of on the order of minutes. Displays it possible to efficiently improve reaction productivity using a simple constitution. In particular, adoption of a multiple-acting constitution wherein volumes at which fluid vapor compression is carried out by the aforesaid reciprocating-type cylinder(s) and piston(s) is carried out at both sides of piston(s) permits improvement in reaction efficiency.

While the foregoing reciprocating-type and rotary-type reactors make use of cyclical treatment wherein reaction of reactant substance(s) is carried out in cyclical fashion, in the case of turbine-type reactors it is possible for reactant substance(s) to be supplied thereto continuously and for chemical reaction thereof to be carried out continuously.

Where the fluid is water and/or other such protic fluid, if the substance to be treated is ligneous feedstock and/or other such organic-type biomass(es), such organic-type biomass(es) may be broken down (solubilized) to produce lower saccharide(s) or the like. Moreover, by subjecting such low-molecular-weight compound(s) to ethanol fermentation, ABE fermentation, and methane fermentation, efficient conversion to gaseous component(s) and/or liquid component(s) which are capable of being used as fuel or the like will be possible. Where such gaseous component is, for example, methane gas, this might furthermore be reused by supplying same to methanol synthesizing apparatus(es), gas engine(s), and/or the like.

The invention claimed is:

1. A reaction apparatus for organic and/or other substance(s) employing supercritical fluid(s) and/or subcritical fluid(s), comprising:
    a reactor operative for compressing vapor(s) and obtaining supercritical fluid(s) and/or subcritical fluid(s), for bringing supercritical fluid(s) and/or subcritical fluid(s) into contact with organic matter and/or other reactant substance(s), for causing occurrence of chemical reaction(s), and for causing expansion and decompression of the fluid(s) including product(s) produced as a result of chemical reaction(s), the reactor including cylinder(s) and piston(s) provided at such cylinder(s) and operative to sequentially actuate by operating such piston(s) to cause compression of fluid(s); operating the piston(s) in reverse direction(s) following the chemical reaction(s) of the reactant substance(s) to lower temperature(s) and pressure(s); removing, from the cylinder(s), fluid(s)

including the produced product(s); and, delivering new charge(s) of vapor(s) to the cylinder(s), and explosive disintegration apparatus(es) that rapidly depressurize reactant substance(s) while same is or are immersed in high-pressure saturated fluid(s); organic substance(s) and/or other reactant substance(s) being pulverized by such explosive disintegration apparatus(es) for use in said reactor, wherein the reactor includes a primary actuator for energizing the reactor and a secondary actuator operably connected to the primary actuator, the secondary actuator energized by waste energy of the reactor and operative to assist the primary actuator in energizing the reactor, wherein the secondary actuator is operably connected to the primary actuator by coupling together a first crank mechanism and a second crank mechanism, said first crank mechanisum being connected the primary actuator, and said second crank mechanism being connected to the secondary actuator, and wherein either or both of said first crank mechanism and said second crank mechanism is a cam mechanism.

2. A reaction apparatus for organic and/or other substance(s) employing supercritical fluid(s) and/or subcritical fluid(s) according to claim 1 wherein operation of piston(s) causes vapor(s) to be compressed at only one side within cylinder(s).

3. A reaction apparatus for organic and/or other substance(s) employing supercritical fluid(s) and/or subcritical fluid(s) according to claim 1 wherein delivery of new charge(s) of vapor(s) to cylinder(s) only involves saturated vapor(s) of fluid(s), cold fluid(s) or saturated liquid(s) of fluid(s) being injected into cylinder(s) together with reactant substance(s) during initiation of compression by piston(s), in mid-compression, or following conclusion of compression.

4. A reaction apparatus for organic and/or other substance(s) employing supercritical fluid(s) and/or subcritical fluid(s) according to any of claims 1, 2 and 3 wherein volume(s), at which compression of vapor(s) is carried out, formed by piston(s) and cylinder(s) are provided to either side of piston(s).

5. A reaction apparatus for organic and/or other substance(s) employing supercritical fluid(s) and/or subcritical fluid(s) according to claim 4 wherein compressor-expander(s) is or are provided to either side of piston(s), and injector(s) (feedstock spray apparatus(es)) is or are provided at respective compressor-expanders.

6. A reaction apparatus for organic and/or other substance(s) employing supercritical fluid(s) and/or subcritical fluid(s) according to any of claims 1, 2 and 3 wherein wet vapor(s) of fluid(s) are compressed by one of volumes or sets of volumes, at which compression of vapor(s) is carried out, formed by piston(s) and cylinder(s) and provided to either side of piston(s), the other of volumes or sets of volumes maintaining fluid vapor(s) at high pressure(s).

7. A reaction apparatus for organic and/or other substance(s) employing supercritical fluid(s) and/or subcritical fluid(s) according to any of claims 1, 2 and 3 wherein, at mechanism(s) comprising cylinder(s) and piston(s) provided at such cylinder(s), work of piston(s) is recovered.

8. A reaction apparatus for organic and/or other substance(s) employing supercritical fluid(s) and/or subcritical fluid(s) according to any of claims 1, 2, and 3 provided with means for causing fluid(s) including product(s) obtained from chemical reaction(s) to be separated into saturated matter and saturated vapor(s) by cyclone separator(s) and/or centrifugal separator(s).

9. A reaction apparatus for organic and/or other substance(s) employing supercritical fluid(s) and/or subcritical fluid(s) according to any of claims 1, 2, and 3 wherein passage switching valve(s) and/or other such open-/close-type member(s) are respectively provided at introductive port(s) and scavenging valves(s) in mechanism(s) comprising cylinder(s) and/or rotor chamber(s) and piston(s) for such cylinder(s) and/or rotor(s) for such rotor chamber(s); and in addition, such open-/close-type member(s) are such as to allow setting of open and/or closed state(s) thereof, setting of such open-/close-type member(s) so as to cause closure thereof at fixed time interval(s) permitting supercritical treatment by such mechanism(s) to be carried out continuously and in ongoing fashion.

10. A reaction apparatus for organic and/or other substance(s) employing supercritical fluid(s) and/or subcritical fluid(s) according to claim 9 wherein scavenger member(s) and member(s) introducing vapor(s) into respective cylinder(s) and/or respective rotor chamber(s) in mechanism(s) comprising cylinder(s) and/or rotor chamber(s), as well as piston(s) and/or rotor(s) for same, there being a plurality thereof, are sequentially coupled by way of passage switching valve(s) and/or other such open-/close-type member(s); permitting respective processes performed by means for compressing vapor(s) and obtaining supercritical fluid(s) and/or subcritical fluid(s), means for bringing supercritical fluid(s) and/or subcritical fluid(s) into contact with organic substance(s) and/or other reactant substance(s) and causing occurrence of chemical reaction(s), and means for causing expansion and decompression of fluid(s) including product(s) produced as a result of chemical reaction(s) to be carried out a plurality of times.

11. A reaction apparatus for organic and/or other substance(s) employing supercritical fluid(s) and/or subcritical fluid(s) according to any of claims 1, 2, and 3 wherein mechanism(s) comprising cylinder(s) and/or rotor chamber(s), as well as piston(s) for such cylinder(s) and/or rotor(s) for such rotor chamber(s), are such that a plurality thereof are provided.

12. A reaction apparatus for organic and/or other substance(s) employing supercritical fluid(s) and/or subcritical fluid(s) according to any of claims 1, 2, and 3 provided with oxidant spray apparatus(es) permitting sprayed introduction of oxidant(s) into high-pressure reaction vessel(s) present at cylinder(s), rotor chamber(s), and/or between turbocompressor(s) and turbine(s); introduced organic substance(s) and/or other reactant substance(s) being oxidatively decomposed while in supercritical state(s).

13. A reaction apparatus for organic and/or other substance(s) employing supercritical fluid(s) and/or subcritical fluid(s) according to any of claims 1, 2, and 3 provided with gasification apparatus(es) further separating, into gas component(s) and liquid component(s), saturated vapor(s) separated from fluid mixture(s) of product(s).

14. A reaction apparatus for organic and/or other substance(s) employing supercritical fluid(s) and/or subcritical fluid(s) according to any of claims 1, 2, and 3 wherein reactant substance(s) is or are biomass feedstock(s) including municipal refuse; and product(s) is or are glucose and/or other such low-molecular-weight sugar(s) and/or the like obtainable through decomposition of biomass(es).

15. A reaction apparatus for organic and/or other substance(s) employing supercritical fluid(s) and/or subcritical fluid(s) according to any of claims 1, 2, and 3 wherein reactant substance(s) is or are any substance(s) selected from among biomass feedstock(s) including municipal refuse, discarded tire(s), coal and/or other such carbon-containing substance(s); and product(s) is or are synthesized gas(es) including methane gas, hydrogen, carbon dioxide, and carbon monoxide obtainable through decomposition of the aforesaid selected substance(s).

16. A reaction apparatus for organic and/or other substance(s) employing supercritical fluid(s) and/or subcritical fluid(s) according to any of claims 1, 2, and 3 wherein reactant substance(s) is or are PET (POLYETHYLENE TEREPHTHALATE) bottle(s) and/or other such high-molecular-weight polymer(s); and product(s) is or are high-molecular-eight-polymer-material feedstock substance(s).

17. A reaction apparatus for organic and/or other substance(s) employing supercritical fluid(s) and/or subcritical fluid(s) according to any of claims 1, 2, and 3 wherein reactant substance(s) is or are waste cooking oil(s) and/or other such fat(s) and/or oil(s); same being converted into fatty acid ester(s) by supercritical fluid(s) and/or subcritical fluid(s).

18. A reaction apparatus for organic and/or other substance(s) employing supercritical fluid(s) and/or subcritical fluid(s) according to any of claims 1, 2, and 3 wherein reactant substance(s) is or are PCB(s) (POLYCHLORINATED BIPHENYL(s)), R-series refrigerant(s), DXN(s) (dioxin(s)), and/or other such chlorine-containing substance(s); reactant substance(s) being decomposed and rendered harmless.

19. A reaction apparatus for organic and/or other substance(s) employing supercritical fluid(s) and/or subcritical fluid(s), comprising:

a reactor operative for compressing vapor(s) and obtaining supercritical fluid(s) and/or subcritical fluid(s), for bringing supercritical fluid(s) and/or subcritical fluid(s) into contact with organic matter and/or other reactant substance(s), for causing occurrence of chemical reaction(s), and for causing expansion and decompression of the fluid(s) including product(s) produced as a result of chemical reaction(s), the reactor including cylinder(s) and piston(s) provided at such cylinder(s) and operative to sequentially actuate by operating such piston(s) to cause compression of fluid(s); operating the piston(s) in reverse direction(s) following the chemical reaction(s) of the reactant substance(s) to lower temperature(s) and pressure(s); removing, from the cylinder(s), fluid(s) including the produced product(s); and, delivering new charge(s) of vapor(s) to the cylinder(s); and explosive disintegration apparatus(es) that rapidly depressurize reactant substance(s) while same is or are immersed in high-pressure saturated fluid(s); organic substance(s) and/or other reactant substance(s) being pulverized by such explosive disintegration apparatus(es) for use in said reactor.

20. A reaction apparatus for organic and/or other substance(s) employing supercritical fluid(s) and/or subcritical fluid(s), comprising:

a reactor operative for compressing vapor(s) and obtaining supercritical fluid(s) and/or subcritical fluid(s), for bringing supercritical fluid(s) and/or subcritical fluid(s) into contact with organic matter and/or other reactant substance(s), for causing occurrence of chemical reaction(s), and for causing expansion and decompression of the fluid(s) including product(s) produced as a result of chemical reaction(s), the reactor including cylinder(s) and piston(s) provided at such cylinder(s) and operative to sequentially actuate by operating such piston(s) to cause compression of fluid(s); operating the piston(s) in reverse direction(s) following the chemical reaction(s) of the reactant substance(s) to lower temperature(s) and pressure(s); removing, from the cylinder(s), fluid(s) including the produced product(s); and, delivering new charge(s) of vapor(s) to the cylinder(s); and ethanol fermentor(s) having colon *bacillus* or *bacilli* and yeast(s) into which liquid component(s) of glucose and/or other such low-molecular-weight sugar(s) and/or other such product(s) obtained through decomposition of biomass(es) via said reactor is or are introduced; sugar(s) introduced into such ethanol fermentor(s) being converted as far as ethanol by the aforesaid yeast(s), colon *bacillus* or *bacilli* , and/or the like.

21. A reaction apparatus for organic and/or other substance(s) employing supercritical fluid(s) and/or subcritical fluid(s), comprising:

a reactor operative for compressing vapor(s) and obtaining supercritical fluid(s) and/or subcritical fluid(s), for bringing supercritical fluid(s) and/or subcritical fluid(s) into contact with organic matter and/or other reactant substance(s), for causing occurrence of chemical reaction(s), and for causing expansion and decompression of the fluid(s) including product(s) produced as a result of chemical reaction(s), the reactor including cylinder(s) and piston(s) provided at such cylinder(s) and operative to sequentially actuate by operating such piston(s) to cause compression of fluid(s); operating the piston(s) in reverse direction(s) following the chemical reaction(s) of the reactant substance(s) to lower temperature(s) and pressure(s); removing, from the cylinder(s), fluid(s) including the produced product(s); and, delivering new charge(s) of vapor(s) to the cylinder(s); and ABE fermentor(s) having ABE fermentation microorganism(s) into which liquid component(s) of glucose and/or other such low-molecular-weight sugar(s) and/or other such product(s) obtained through decomposition of biomass(es) via said reactor is or are introduced; sugar(s) introduced into ABE fermentor(s) being converted as far as acetone, butanol, and ethanol by ABE fermentation microorganism(s).

22. A reaction apparatus for organic and/or other substance(s) employing supercritical fluid(s) and/or subcritical fluid(s), comprising:

a reactor operative for compressing vapor(s) and obtaining supercritical fluid(s) and/or subcritical fluid(s), for bringing supercritical fluid(s) and/or subcritical fluid(s) into contact with organic matter and/or other reactant substance(s), for causing occurrence of chemical reaction(s), and for causing expansion and decompression of the fluid(s) including product(s) produced as a result of chemical reaction(s), the reactor including cylinder(s) and piston(s) provided at such cylinder(s) and operative to sequentially actuate by operating such piston(s) to cause compression of fluid(s); operating the piston(s) in reverse direction(s) following the chemical reaction(s) of the reactant substance(s) to lower temperature(s) and pressure(s); removing, from the cylinder(s), fluid(s) including the produced product(s); and, delivering new charge(s) of vapor(s) to the cylinder(s); and methane fermentor(s) having methane fermentation microorganism(s) into which gaseous component(s) of product(s) obtained through decomposition of biomass(es) via said reactor is or are introduced; sugar(s) from product(s) introduced into methane fermentor(s) being decomposed as far as methane gas by methane fermentation microorganism(s).

\* \* \* \* \*